(12) United States Patent
Nabors et al.

(10) Patent No.: US 7,236,983 B1
(45) Date of Patent: Jun. 26, 2007

(54) HIERARCHICAL DATA STRUCTURE FOR VEHICLE IDENTIFICATION AND CONFIGURATION DATA INCLUDING PROTECTED CUSTOMER DATA

(75) Inventors: Forrest Nabors, Tigard, OR (US); Tom Garrigus, Portland, OR (US); Celas Hug, Beaverton, OR (US); Charlie Zhang, Lake Oswego, OR (US)

(73) Assignee: Chrome Data Corporation, Oregon City, OR (US)

( * ) Notice: Subject to any disclaimer, the term of this patent is extended or adjusted under 35 U.S.C. 154(b) by 0 days.

(21) Appl. No.: 09/374,577

(22) Filed: Aug. 13, 1999

Related U.S. Application Data

(63) Continuation-in-part of application No. 09/188,863, filed on Nov. 9, 1998.

(51) Int. Cl.
*G06F 17/30* (2006.01)

(52) U.S. Cl. .................... 707/104.1; 707/9; 707/10
(58) Field of Classification Search .............. 707/9, 707/10, 100, 104.1, 26, 27
See application file for complete search history.

(56) References Cited

U.S. PATENT DOCUMENTS

| | | | |
|---|---|---|---|
| 4,799,156 A | | 1/1989 | Shavit et al. |
| 4,992,940 A | * | 2/1991 | Dworkin ............. 705/26 |
| 5,021,953 A | | 6/1991 | Webber et al. |
| 5,113,341 A | * | 5/1992 | Kozol et al. ............ 707/513 |
| 5,117,354 A | | 5/1992 | Long et al. |
| 5,185,698 A | * | 2/1993 | Hesse et al. ............ 707/513 |
| 5,283,731 A | * | 2/1994 | Lalonde et al. ......... 705/1 |
| 5,307,261 A | | 4/1994 | Maki et al. |
| 5,471,619 A | * | 11/1995 | Messina ................. 707/8 |
| 5,515,269 A | | 5/1996 | Willis et al. |
| 5,515,524 A | * | 5/1996 | Lynch et al. ............ 703/13 |

(Continued)

FOREIGN PATENT DOCUMENTS

| | | |
|---|---|---|
| WO | WO 98/21679 | 5/1998 |

OTHER PUBLICATIONS f"Lycos deploys Seven of PersonaLogic's Interactive Decision Guides for an Enhanced Online Shopping Experience" PR Newswire, Jun. 8, 1998 Dialog File 20, Record # 01863400.*

(Continued)

*Primary Examiner*—Jack Choules
(74) *Attorney, Agent, or Firm*—Blakely Sokoloff Taylor & Zafman

(57) ABSTRACT

A description language providing a hierarchical data structure that includes a public portion, hierarchically storing product information including identification of the product and standard and optional features desired for the product. The data structure further includes a private portion for secure storage of customer information. The discloser includes a system comprising a server with a product database, an intermediary subsystem, and a seller subsystem. A product is configured which stores the configured product and features in the data structure. A request for quote (RFQ) is transmitted, with the data structure, to sellers in the customer's geographic area, based on a comparison of product features with sellers stock. Quotes are returned from the sellers in response to which the customer sends an acceptance of a quote to the appropriate seller. While the invention is applicable to any product available in multiple configurations, specific embodiments are directed to vehicle implementations.

12 Claims, 17 Drawing Sheets

U.S. PATENT DOCUMENTS

| | | | |
|---|---|---|---|
| 5,592,375 A * | 1/1997 | Salmon et al. ............... 705/7 |
| 5,689,652 A | 11/1997 | Lupien et al. |
| 5,701,458 A * | 12/1997 | Bsaibes et al. ............... 707/9 |
| 5,708,798 A | 1/1998 | Lynch et al. |
| 5,748,618 A * | 5/1998 | Rothrock ............... 370/260 |
| 5,774,121 A | 6/1998 | Stiegler |
| 5,794,207 A | 8/1998 | Walker et al. |
| 5,825,651 A | 10/1998 | Gupta et al. |
| 5,897,620 A | 4/1999 | Walker et al. |
| 5,924,082 A | 7/1999 | Silverman et al. |
| 5,966,699 A | 10/1999 | Zandi |
| 5,970,475 A | 10/1999 | Barnes et al. |
| 5,997,475 A | 12/1999 | Bortz |
| 6,009,406 A | 12/1999 | Nick |
| 6,012,051 A * | 1/2000 | Sammon et al. ............... 705/26 |
| 6,041,308 A | 3/2000 | Walker et al. |
| 6,041,310 A * | 3/2000 | Green et al. ............... 705/26 |
| 6,052,669 A * | 4/2000 | Smith et al. ............... 705/26 |
| 6,112,189 A | 8/2000 | Rickard et al. |
| 6,119,101 A * | 9/2000 | Peckover ............... 705/27 |
| 6,131,087 A | 10/2000 | Luke et al. |
| 6,131,118 A * | 10/2000 | Stupek et al. ............... 709/223 |
| 6,154,738 A * | 11/2000 | Call ............... 705/20 |

OTHER PUBLICATIONS

"PCAgent and CMP Partner to Launch TechShopper", DIALOG, File 813:PR Newswire, Apr. 22, 1997.* ask.chrysler.com webpage, copyright 1996-2000.*

Draft Proposal. An Industry Standard Data Format for the Export and Import of Automotive Customer Leads, 21 pages from www.carpoint.msn.com/xml/.

* cited by examiner

HIERARCHICAL DATA STRUCTURE FOR VEHICLE IDENTIFICATION AND CONFIGURATION DATA INCLUDING PROTECTED CUSTOMER DATA

CROSS-REFERENCE TO RELATED APPLICATIONS

This application is a continuation-in-part of, and claims priority from, U.S. patent application Ser. No. 09/188,863, filed Nov. 9, 1998, and still pending.

FIELD OF THE INVENTION

The invention provides an apparatus and a process for facilitating customer-driven sales of products having multiple configurations over a wide area electronic network, and more particularly a process for facilitating customer-driven sales of automobiles over the Internet.

BACKGROUND OF THE INVENTION

The Internet has developed as an important vehicle for information exchange, as well as a forum for conducting, or at least facilitating, commerce. Systems using the Internet as a commercial forum fall broadly into two categories: seller-driven or customer-driven. The difference between customer and seller driven systems lies in which party takes the initiative to find the other. In a seller-driven system, the seller finds the customer; in a customer-driven system the customer finds the seller.

Most Internet commerce systems in use today are seller-driven and are either passive sites or active sites. A typical seller's Internet site is a passive advertising site that provides information about the product and directs potential customers to places they can obtain the product. Automobile manufacturers are a typical example: their sites provide information about the manufacturer's line of cars, available options, and locations of authorized dealers.

A smaller number of sellers have active selling sites that not only provide product information but allow potential customers to conduct a transaction over the Internet and purchase the product. The seller prices and packages the product and then holds it out for sale to potential customers via the Internet. The seller specifies, through their web site, the terms of the sale, and potential customers must either accept the seller's terms or find another seller whose terms are acceptable. Products sold on these sites are typically lower-priced standardized goods such as books, compact disks, and videos.

In a customer-driven system, the customer specifies the product they want and the terms under which they will buy it, and then sends this specification to sellers. Some attempts have been made to implement customer-driven systems on the Internet. Examples are news groups and bulletin boards where any potential customer can post "wanted" ads at little or no cost. Customer driven systems has certain benefits that other systems do not. Where a large number of potential sellers exist, but those sellers do not have the resources to advertise globally, it makes sense for customers, if they can, to take the initiative in communicating their needs to a seller. The Internet is ideal in this situation because Internet postings are global, and the customer theoretically can communicate his offer to a large number of potential sellers. Moreover, customers can usually exercise more control over the terms and conditions of their purchases.

Despite their advantages, existing customer-driven systems have some drawbacks. Sellers are deterred from using customer-driven systems because sellers do not want to be inundated with numerous requests from potential customers, many of whom may be marginal or unqualified. Moreover, if each customer has a different set of purchasing specifications and communicates his or her needs to sellers using a non-standard format with different conditions, terms, and language styles, the specification may require too much time for the seller to interpret. Furthermore, sellers are deterred from using customer-driven systems because there is no guarantee of the authenticity of the request, and the financial ability of the customer to enter into the transaction is uncertain. In addition, such "customers" may actual be rival sellers looking for competitor pricing information.

Newsgroups scattered across the Internet make it difficult, if not impossible, for sellers to find customer requests. In practice, these customer-driven systems are ineffective because potential sellers do not frequent all the various newsgroups or bulletin boards or respond to posting in those places. Customers are deterred from using customer-driven systems for many of the same reasons sellers are deterred. For example, a potential seller does not want to be inundated with offers from many marginal or unqualified customers.

The problems inherent in existing customer-driven systems are compounded where the product being sold is available in multiple configurations, for example motor vehicles such as an automobile or a truck. These products cause problems because for any given product there are thousands of possible option configurations, and not all combinations of options are feasible. For example, automobile manufacturers usually do not make vehicles having every possible combination of options, but rather make the most popular ones. Thus, for example, if a potential customer wants a purple Ford truck with a yellow interior and a V-12 engine, that engine and combination of colors may not be available from the manufacturer (Ford). The customer, however, has no way of knowing this before sending the request to potential sellers.

Attempts have been made to implement customer-driven systems that address some of the above problems. U.S. Pat. No. 5,794,207 to Walker et. al. ("Walker") is illustrative. Walker does not, however, solve all the foregoing problems. Among other things, Walker does not direct the customer's request to a target set of sellers who are likely, if not certain, to have the desired product. Instead, Walker merely places the customer's request where interested sellers can access it. Walker, although it provides for guaranteeing payment by the customer, does not guarantee that the sellers will be credible and able to deliver. Walker does not provide means for checking whether a complex product the customer wants is feasible, that is, whether it exists or can be manufactured. Finally, Walker provides a system where the customer must send a binding purchase offer that can be accepted by any seller, thereby binding the customer to a contract. This opens up the possibility that an unscrupulous seller could accept the offer. There is thus a need in the art for an apparatus and method that solves the above problems.

SUMMARY OF THE INVENTION

The present invention provides a vehicle description language (VDL) being designed to implement a hierarchical data structure stored in and transmitted between computers connected to a digital communication network such as the Internet. The networked computers are linked through an intermediary subsystem and communicate information associated with a vehicle, for example a request for quote (RFQ) seeking a quote on a specific vehicle. The hierarchical data structure with vehicle information is communicated between network computers in support of applications for facilitating customer-driven sales. The hierarchical data structure is made up of blocks and sub blocks each containing further sub-blocks or organized data items and having delimiters to identify the beginning and end of each block or sub block. The hierarchical data structure includes a public data block and a private data block. The public data block is made up of a vehicle sub-block with data items such as manufacturer, model, a model year and style of the vehicle, a vehicle detail sub-block has further sub-blocks including a standard feature sub-block with standard feature categories containing data items relating to the standard equipment available on the vehicle and an optional feature sub block with optional feature categories containing data items relating to a particular category of optional equipment desired on a particular vehicle. The private data block is made up of a plurality of data items relating to the customer who is ordering the vehicle and other data items such as ranking of product attributes. One of the computers connected to the network receives the hierarchical data structure implemented with the VDL and uses data including the data in the vehicle detail sub-block to select some sellers from a predetermined group of vehicle sellers by comparing features of the vehicle in RFQ with the features in vehicles of the sellers in the predetermined group.

The hierarchical data structure is disclosed as used with an apparatus and process for facilitating customer-driven sales of products having multiple configurations. The apparatus of the present invention comprises a computer network apparatus to facilitate the purchase of a product having multiple configurations, the product being sold by manufacturer-licensed sellers and each product configuration being described by a set of product attributes. The computer network apparatus comprises a server, an intermediary subsystem, and a seller subsystem.

The process uses a computer network to facilitate the purchase of a product having multiple configurations, the product being sold by manufacturer-licensed sellers and each product configuration being described by a set of product attributes. The process includes configuring a customer's desired product by selecting the customer's desired set of product attributes; selecting a target set of sellers in the customer's geographical area, the target set comprising at least one seller; and transmitting a request for quote (RFQ) to the target set of sellers, the RFQ including the customer's desired set of product attributes and the RFQ being transmitted to a seller subsystem using the computer network. When sellers receive an RFQ, at least one seller from the target set of sellers' responds to the RFQ with a quote, the quote being input through a seller subsystem and transmitted using the computer network. The quotes received are transmitted to the customer. The customer selects for acceptance a quote that matches their desired attributes and transmits their acceptance to the seller.

DETAILED DESCRIPTION OF THE INVENTION

Several embodiments of the present invention are described in detail herein. The embodiments illustrate several ways in which the present invention may be implemented. Although the embodiments are described in the context of automobile purchases, they could easily be used for other products with multiple configurations and manufacturer-authorized sellers, as well. In the description that follows, like numerals represent like elements or steps in all figures. For example, if the numeral 10 is used in one figure to refer to a specific element or step, the numeral 10 appearing in any other figure refers to the same element.

First Embodiment

Figure 1:
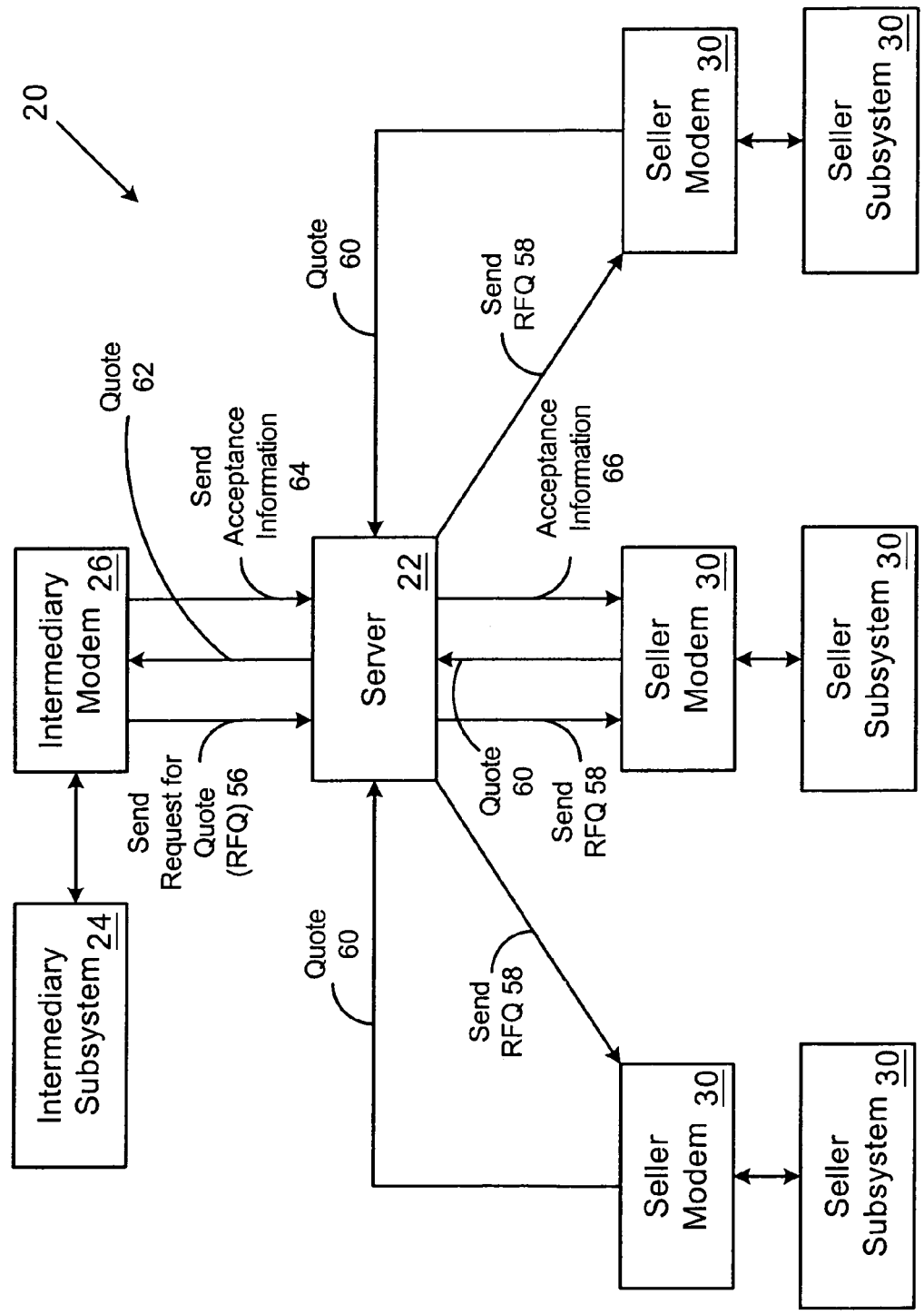
FIG. 1 illustrates the inventive apparatus and inventive process of a first embodiment of the invention.
Figure 2:
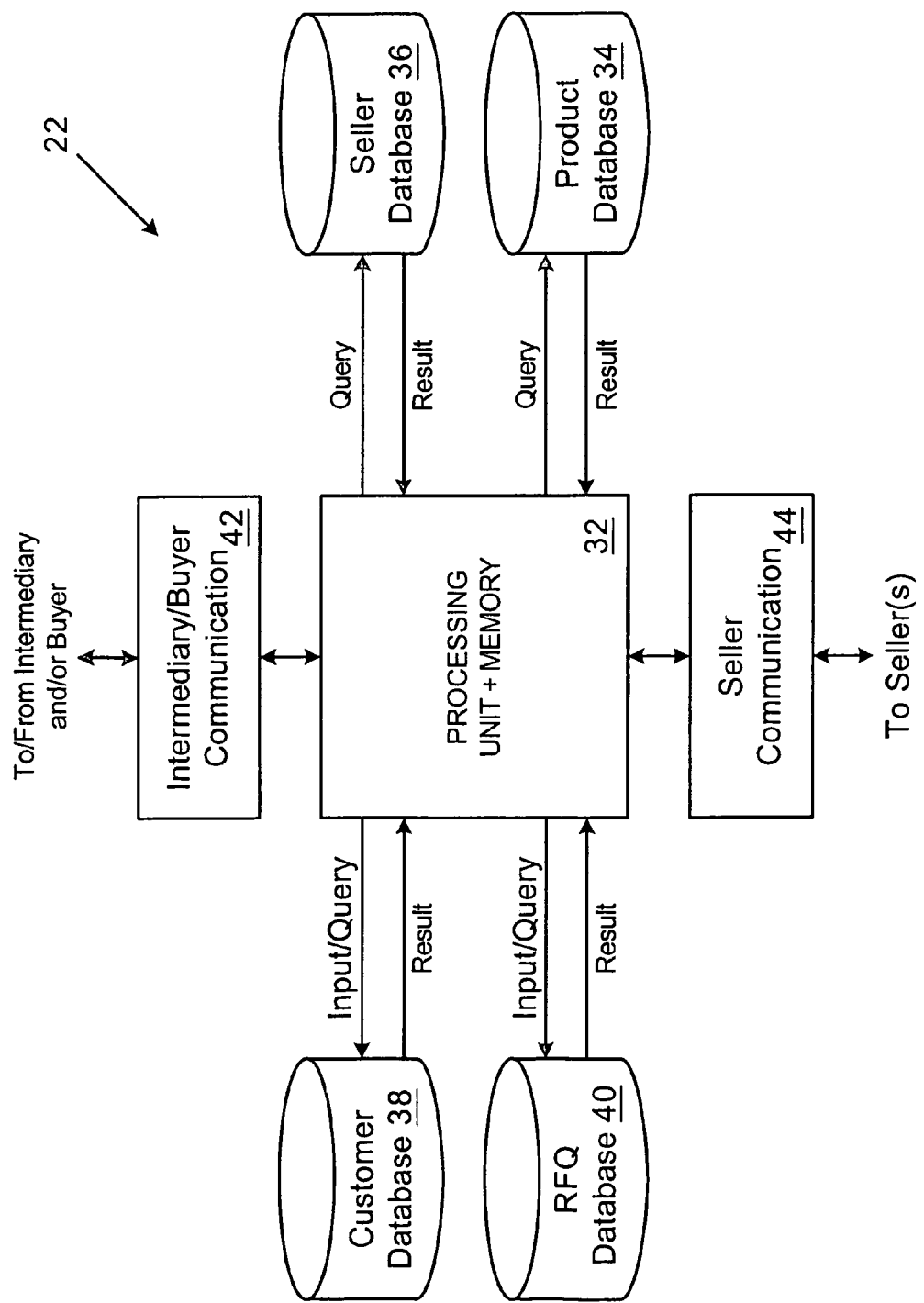
FIG. 2 illustrates details of a server used in the first embodiment of the inventive apparatus and inventive process.
Figure 3:
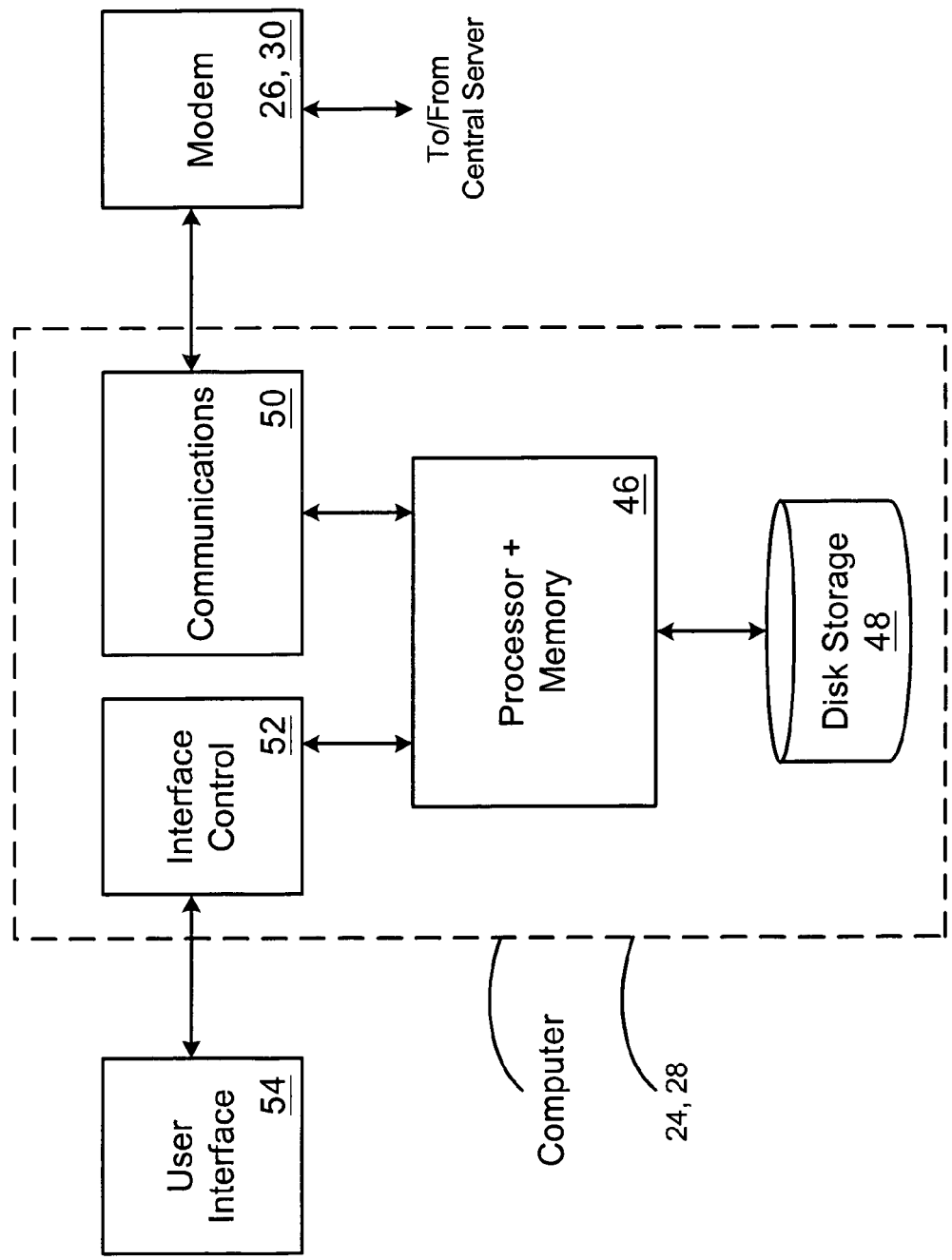
FIG. 3 illustrates details of an intermediary subsystem or a seller subsystem usable with the first embodiment of the apparatus and process.

FIGS. 1 through 3 together illustrate a first embodiment of the inventive apparatus and process. The apparatus and process of the first embodiment are used to facilitate the purchase of a product having multiple possible configurations, such as an automobile, and are intended to be used by an intermediary and one or more sellers to facilitate a product purchase on behalf of a customer. An intermediary is a professional customer, such as a bank, credit union, auto broker or other automobile-buying professional, and in some cases the intermediary and the customer may be the same entity, for example when the intermediary is a corporate fleet auto customer buying automobiles on behalf of a corporation. The involvement of an intermediary, such as a bank or credit union, provides assurance to both customers and to sellers that the other party to the transaction is "credible", that is, able to complete the transaction. The inventive process is customer-driven, meaning that the customer initiates a transaction over a network and controls the transaction throughout the process of the transaction. The inventive process allows an intermediary to send a request for quote (RFQ) to multiple sellers, and allows multiple sellers to submit quotes in response to the RFQ. Using this quoteding process the customer is assured of getting the specified goods at a competitive price. FIG. 1 illustrates the transaction process.

As shown in FIG. 1, the apparatus is a computer network comprising a server 22; at least one intermediary subsystem 24 connected to the server via an intermediary network connecting means (e.g., intermediary modem 26); and at least one seller subsystem 28 connected to the server via a seller network connecting means (e.g., seller modem 30). Although referred to as modems, the intermediary modem 26 and seller modem 30 could be any other communication means that enables network communication, for example, ethernet links. The intermediary modem 26 and seller modems 30 can be connected to the server by a variety of connecting means, including public telephone land lines, dedicated data lines, cellular links, microwave links, or satellite communication.

FIG. 2 illustrates details of the server 22. The server 22 is essentially a high-capacity, high-speed computer that includes a processing unit 32 connected to four databases: a product database 34, a seller database 36, a customer database 38, and a request-for-quote (RFQ) database 40. Additional databases are optionally added to the server, for example databases to track market research information for later sale to manufacturers, such as customer demographics, marketing information, etc. Also connected to the processing unit 32 is sufficient memory (shown as part of the processing unit, but the memory could be a separate component) and appropriate intermediary communication hardware 42 and seller communication hardware 44. Like the intermediary modem 26 and the seller modem 28, the intermediary communication hardware 42 and seller communication hardware 44 may be modems, ethernet connections, or any other suitable communication hardware. In addition, although shown as separate units the intermediary communication hardware 42, the seller communication hardware 44 may be a single unit. Although the server 22 has been shown as a single computer having a single processing unit 32, it is also possible that the server could be spread over several networked computers, each having its processor and having one or more databases resident thereon.

In addition to the elements described above, the server 22 further comprises an operating system and communication software allowing the server to communicate with other computers. The preferred operating system is Microsoft Windows NT, while the preferred communication software is a Microsoft IIS (Internet Information Server) server with associated programs.

The databases on the server 22 contain the information necessary to make the apparatus and process work. The product database 34 contains a variety of information about the product, including product attributes, available combinations of product attributes, and product pricing. The seller database 36 contains information about authorized sellers of the product, including their name, address, relevant geographical areas served, and manufacturer-authorized product lines. The customer database 38 includes a variety of information about the customers, including names, addresses, and product preferences. The customer database is structured so that it maintains a customer list for each intermediary that uses the apparatus and process. Finally, the request-for-quote database 40 stores information about RFQ's sent by the server 22, if any, including the status (i.e., whether the RFQ is pending, abandoned, expired, whether a quote has been received for the RFQ, etc.). The databases are assembled and accessed using any commercially available database software, such as Microsoft Access, Oracle, etc. Microsoft SQL Version 6.5 is the preferred database for this application.

FIG. 3 illustrates details of the intermediary subsystem 26 and seller subsystem 28. Both subsystems 26 and 28 generally include a processor 46 attached to storage unit 48, a communication controller 50, and a display controller 52. The display controller runs a display unit through which the intermediary and seller interact with the subsystems 26 or 28. In essence, the subsystems 26 and 28 are computers able to run software providing a means for communicating with the server 22. This software, for example, is an Internet web browser such as Microsoft Internet Explorer, Netscape Navigator, or other suitable internet web browsers.

In addition to showing the apparatus of the first embodiment, FIG. 1 outlines the basic steps and information transfer of the process. The details of the process are further discussed below in connection with FIGS. 4, 5 and 6. Having put together a request for quote (RFQ) configuring the automobile the customer wants, at step 56 the intermediary transmits the RFQ from the intermediary subsystem 24 through the modem 26 to the server 22. At step 58, the RFQ is transmitted from the server 22 to a target set of seller modems 30 and corresponding seller subsystems 28. The intermediary according to the criteria of geographic region and authorized dealers using the seller database chooses the target set of sellers. If one or more sellers within the target set of sellers decide they wish to submit a quote responsive to the RFQ, then at step 60 each sellers transmits a "quote" from the seller subsystem 28 to the server 22. At step 62, the quotes are transmitted from the server 22 to the intermediary subsystem 24. The intermediary communicates the quotes to the customer (this step not shown). If the customer decides to accept one of the quotes, the customer notifies the intermediary and at step 64 the intermediary transmits an "acceptance response" to the server 22, wherein the acceptance response contains information about the customer from the customer database and identifies a "selected seller." At step 66, the acceptance response is transmitted from the server 22 to the selected seller's subsystem.

Figure 4:
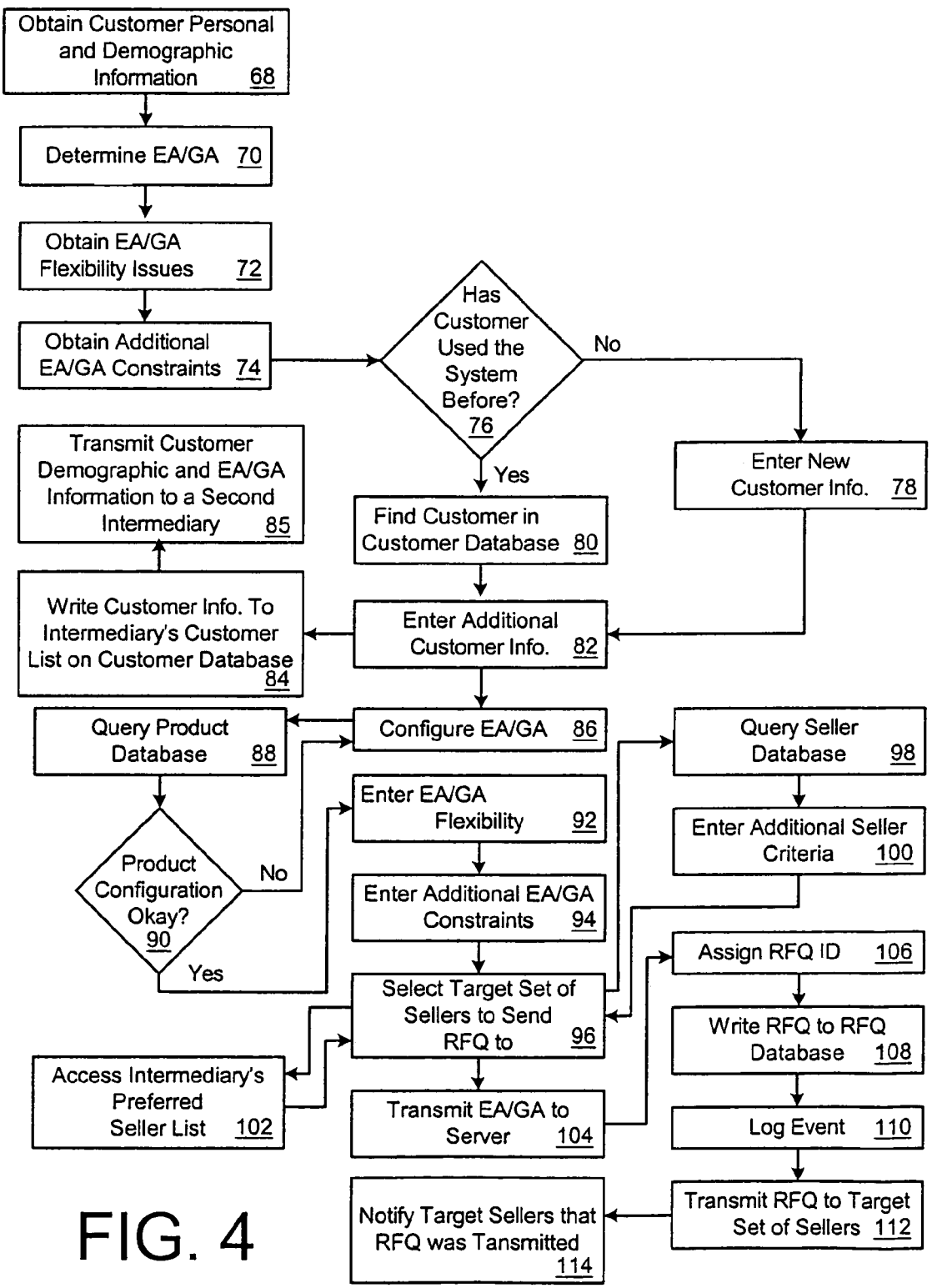
FIG. 4 is a flowchart illustrating an intermediary's portion of the process of the first embodiment.
Figure 5:
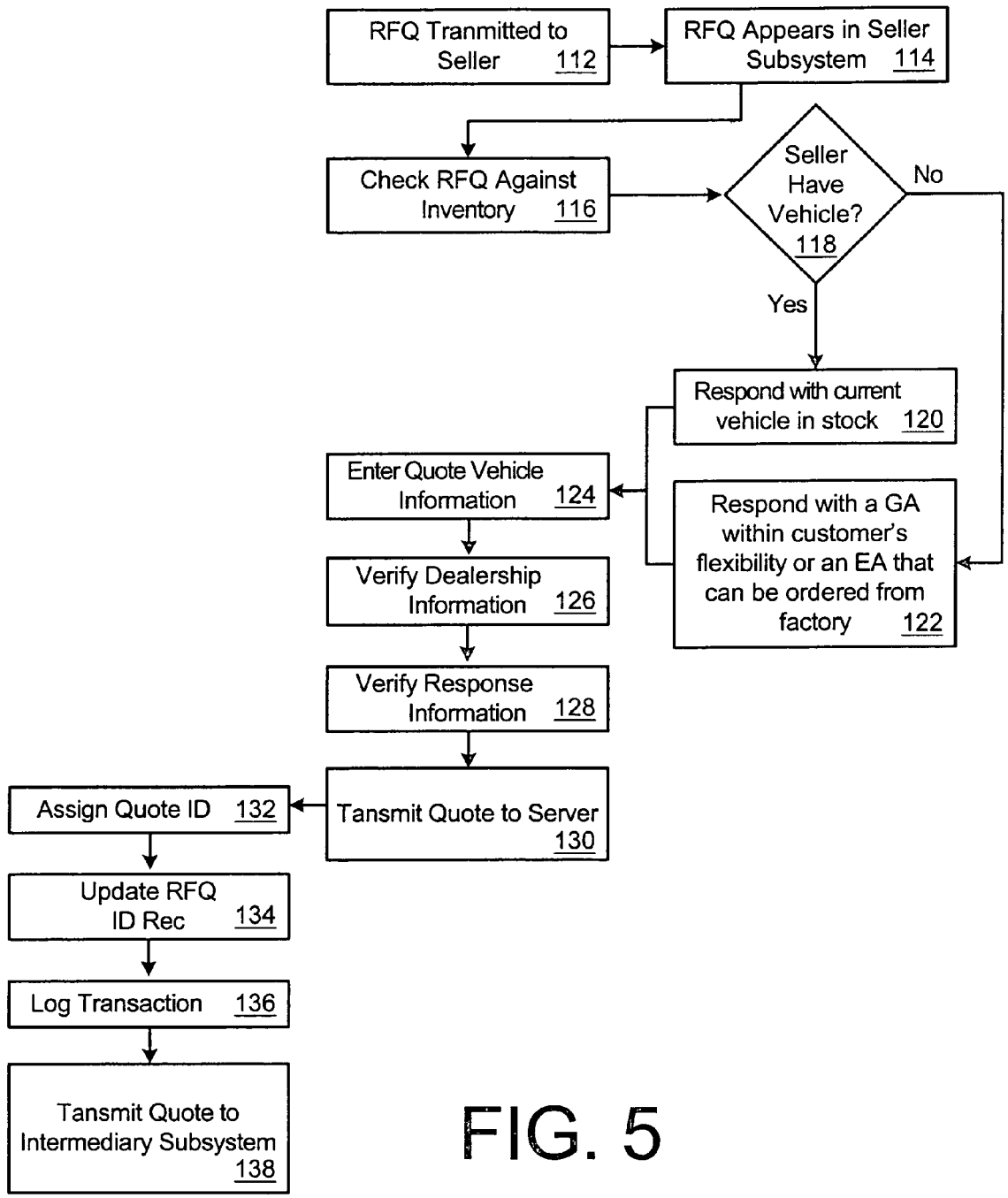
FIG. 5 is a flowchart illustrating the portion of the process of the first embodiment carried out by a target seller.
Figure 6:
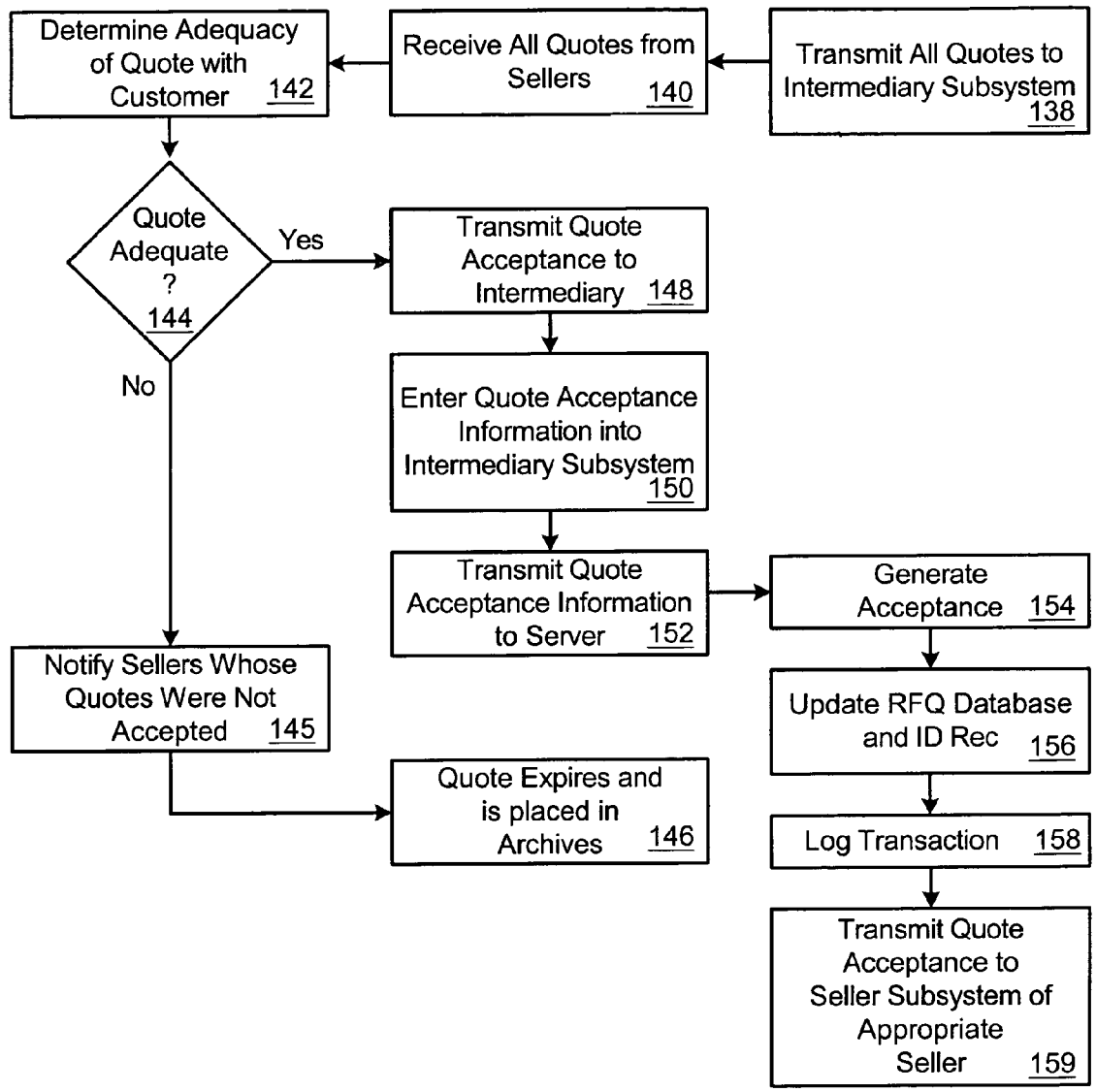
FIG. 6 is a flowchart illustrating the portion of the process used by the intermediary to reply to a quote received from a seller, the seller having responded using the process of FIG. 5.

While FIG. 1 illustrates the outline and information flow of the overall process, FIGS. 4, 5 and 6, illustrate details of the process steps of the first embodiment. FIG. 4 illustrates the first part of the process, which is carried out by the intermediary. Optionally, a first intermediary may also transmit the request to a second intermediary at step 85 to act on behalf of the first intermediary. The process begins when a customer seeking to purchase appropriate goods (i.e., an automobile) contacts the intermediary. At step 68, the intermediary collects personal information from the customer such as their name, address, and financing information (i.e., ability to purchase up to a certain maximum price) and optionally collects demographic information concerning reasons for selecting a particular automobile and other demographic information helpful for market research studies (e.g., age, household income, education, occupation, hobbies/interests, and the like).

Once the customer's personal and demographic information has been gathered, the intermediary gathers information regarding the customer's desired product attributes (i.e., the configuration the customer wants). At step 70 the customer describes to the intermediary the general automobile (GA) they want and optionally also describes the exact automobile (EA) they want. For example, a customer may want a Ford Taurus; this would be the GA. The customer may also want the GA to have an additional set of attributes, for example a 1999 Ford Taurus, white in color, automatic transmission, sun roof, CD changer, black leather interior, and alloy wheels; this would be the EA.

When the customer's GA and EA information has been gathered, the intermediary obtains information from the customer at step 72 regarding their flexibility on the desired attribute set of the EA. Flexibility is determined by assigning a rank between 1 and 5 to each attribute, 5 being high priority and 1 being low priority. Thus, if the customer does not particularly care whether the transmission is manual or automatic, a low rank is assigned to that attribute. If, however, the customer absolutely must have the black leather interior, that attribute is assigned a high rank.

Step 74 is the last information-gathering step for the intermediary. In this step, the intermediary gathers any additional constraints the customer may want to put on the GA or EA they want. Additional constraints may include such items as the customer's desired price range or a date by which the customer must purchase the car.

Having gathered necessary information from the customer, the intermediary establishes a connection between the intermediary subsystem 24 and the server 22. At step 76, the intermediary checks whether the apparatus and process have previously been used to buy a product for this specific customer. If the apparatus and process have not previously been used on behalf of this customer, the intermediary goes to step 78, where the customer's personal and demographic information is entered into the intermediary subsystem 24 and transmitted to the customer database 38. If the apparatus and process have previously been used on this customer's behalf, the intermediary proceeds to step 80, where the customer information is looked up in the customer database 38. Whether or not the customer has used the process before, the intermediary may optionally perform step 82, where any additional information about the customer may be entered into the intermediary subsystem 24, transmitted to the server 22 and, at step 84, written to the intermediary's customer list on the customer database 38.

The intermediary next configures the customer's EA and GA using the product database 34. At step 86, the intermediary enters the customer's EA, GA and flexibility information into the intermediary subsystem 24, transmits this information to the server 22, and uses the information to query the product database at step 88. Having done the product database lookup, the intermediary reviews the results at step 90 to confirm whether the configuration is feasible. A configuration is feasible if, among other things, it exists or can be ordered from a manufacturer, and its price fits within the customer's price range. Thus, the customer may want a purple Ford Taurus 1999 with a neon chartreuse interior for $10,000. If the configuration is not feasible, the intermediary returns to steps 86 and 88 and tries to come up with some feasible configurations that fit within the customer's EA flexibility.

Once the intermediary finds a feasible configuration, the next step is to put together an RFQ in steps 92 and 94. The RFQ consists primarily of the attribute set of the feasible configuration found at step 90. At step 92 the customer's flexibility information (i.e. attribute rankings) is added to the RFQ. Any additional customer constraints, such as an expiration date for the purchase and standard or custom terms of sale, are added to the RFQ at step 94.

When the RFQ has been assembled, the intermediary proceeds to step 96 and selects a target set of sellers to which the RFQ will be sent. There are two methods for the intermediary to select the target list of sellers. In the first method, the intermediary proceeds from step 96 and queries the seller database 36 at step 98 based on selected criteria, for example geographic region and authorizations by manufacturers. The seller database 36 contains information about automobile sellers nationwide, including what product lines they carry and where they are located. The query result will usually be a list of sellers and brokers that are authorized by the relevant manufacturer (Ford in the example) to sell the specified product line, and that are located in the same geographical region as the customer. Thus, if our Ford Taurus customer lives in Tightwad, Mo., the seller database query finds Ford sellers or brokers in a defined geographic region of Tightwad, Mo. Sellers and brokers outside the customer's geographic region could also be found, and may be desirable if, for example, the sellers outside the region are sufficiently price competitive. At step 100, the intermediary can filter the list of sellers based on further seller criteria to obtain a target set of sellers. If, for example, the intermediary has had bad experiences with a particular seller or the particular seller has been unresponsive to previous RFQ's, that seller or broker can be removed from the potential target set of sellers.

The second method by which the intermediary selects the target set of sellers is shown at step 102. At step 102 the intermediary accesses their "preferred seller list" and selects the target set of sellers from this list. The intermediary will have used steps 98 and 100 described above to compile their preferred seller list before even starting the process of FIG. 4, and will have saved the result of steps 98 and 100 on the seller database for future use. The intermediary can always update their preferred seller list.

Having assembled the RFQ and selected the target set of sellers, the intermediary proceeds to step 104, where the RFQ is transmitted to the server 22 (FIG. 1). At step 106, the RFQ is assigned an identification number for tracking, and at steps 108 and 110 the RFQ is written to the RFQ database and the transaction is logged. The RFQ database stores information for each RFQ processed by the apparatus, including the contents of the RFQ, the sellers to which it was sent, its expiration date (if any) and its status (i.e. expired, pending, responded to). At step 112, the RFQ is transmitted from the server 22 to the target set of sellers (see step 56 in FIG. 1). At step 114, which is optional, the target set of sellers may be notified that an RFQ has been sent to them.

FIG. 5 shows a target sellers' side of the process once they receive an RFQ. A target seller is a seller included in the target set of sellers. At step 114, a target seller receives the RFQ. At step 116, the target seller checks the product specified in the RFQ against the products in inventory. At step 118, the seller assesses whether there is a product in inventory that matches the EA specified in the RFQ.

If the target seller has the EA in inventory at step 120, the target seller will put together a quote indicating that they have the EA in inventory and also indicating an asking price for the EA. A target seller is not obligated to submit a quote in response to an RFQ; the seller may choose whether to quote based upon his or her own economic decision making criteria. A quote can optionally be a legal offer that, if accepted by the customer, will bind both the customer and the seller to a legally enforceable contract.

If the EA is not in inventory, the target seller proceeds to step 122 and submits a quote for a product that the customer might find acceptable based on the customer's GA and EA and their attribute flexibility. For example, in the above case where the customer wanted an automatic transmission in the Ford Taurus, the seller may have a Taurus that has most or all of the other features, but has a manual transmission. If the customer has assigned a low rank to the choice of transmission, then the seller can submit a quote specifying the Taurus with a manual transmission and the seller's asking price for that vehicle. Alternatively, if the EA is not in target seller's inventory the target seller can respond at step 122 with an EA that can be ordered from the manufacturer.

The next step is for the target seller to assemble a quote for transmission. At step 124, the seller enters into the seller subsystem 28 the attribute information for the EA, or the GA varying from the EA within the customer's attribute flexibility. Also entered into the seller subsystem 28 are the seller's asking price for the vehicle they are responding with and any additional constraints they wish to place on the transaction. Additional constraints include an expiration time for the quote, and optionally include delivery constraints, payment constraints, or any other contingencies. At step 126, the seller verifies the seller information that will accompany the RFQ; the seller information includes such items as the seller's name, address, etc. If any of the seller information is incorrect, the seller can correct it at this step and the seller database will be updated. If there are any changes to the seller information, the new seller information is transmitted to the server 22 and stored in the seller database 36. The seller information is also transmitted with the quote. At step 128, the seller verifies the quote information that is being submitted and proceeds to step 130, where the quote is transmitted to the server 22. Once transmitted to the server 22, the quote is assigned a number for tracking purposes at step 132, the RFQ database is updated to reflect that a quote has been sent in response to the RFQ at step 134, and the transaction is logged at step 136. The seller's quote is transmitted from the server to the intermediary subsystem 24 at step 138.

FIG. 6 shows the intermediary's part of the process once the quote has been transmitted to the intermediary subsystem 24 from the server 22. When the intermediary receives the seller's quotes at step 140, the intermediary proceeds to step 142 where the quotes are transmitted to the customer by the intermediary using suitable means, such as a telephone, e-mail, or fax machine. The customer assesses the adequacy of each quote at step 144. If the customer does not accept a quote, then the intermediary enters the rejection of the quote into the intermediary subsystem 24 and transmits the rejection to the server 22. At step 145, the server 22 notifies the appropriate seller that the quote was rejected, and at step 146 the quote is tagged as expired and placed in an archive.

If the customer accepts a quote, the customer transmits an acceptance of the quote to the intermediary at step 148. The intermediary proceeds to step 150, where the intermediary enters the acceptance information (delivery instructions, payment methods, etc.) into the intermediary subsystem 24. At step 152, the intermediary subsystem transmits the customer's acceptance information to server 22. The server executes step 154, where a standardized acceptance is generated, and proceeds to steps 156 and 158 where the RFQ database is updated to reflect the acceptance. At step 159, the server transmits the standardized acceptance to the seller subsystem of the appropriate target seller whose quote was accepted by the customer.

Second Embodiment

Figure 7:
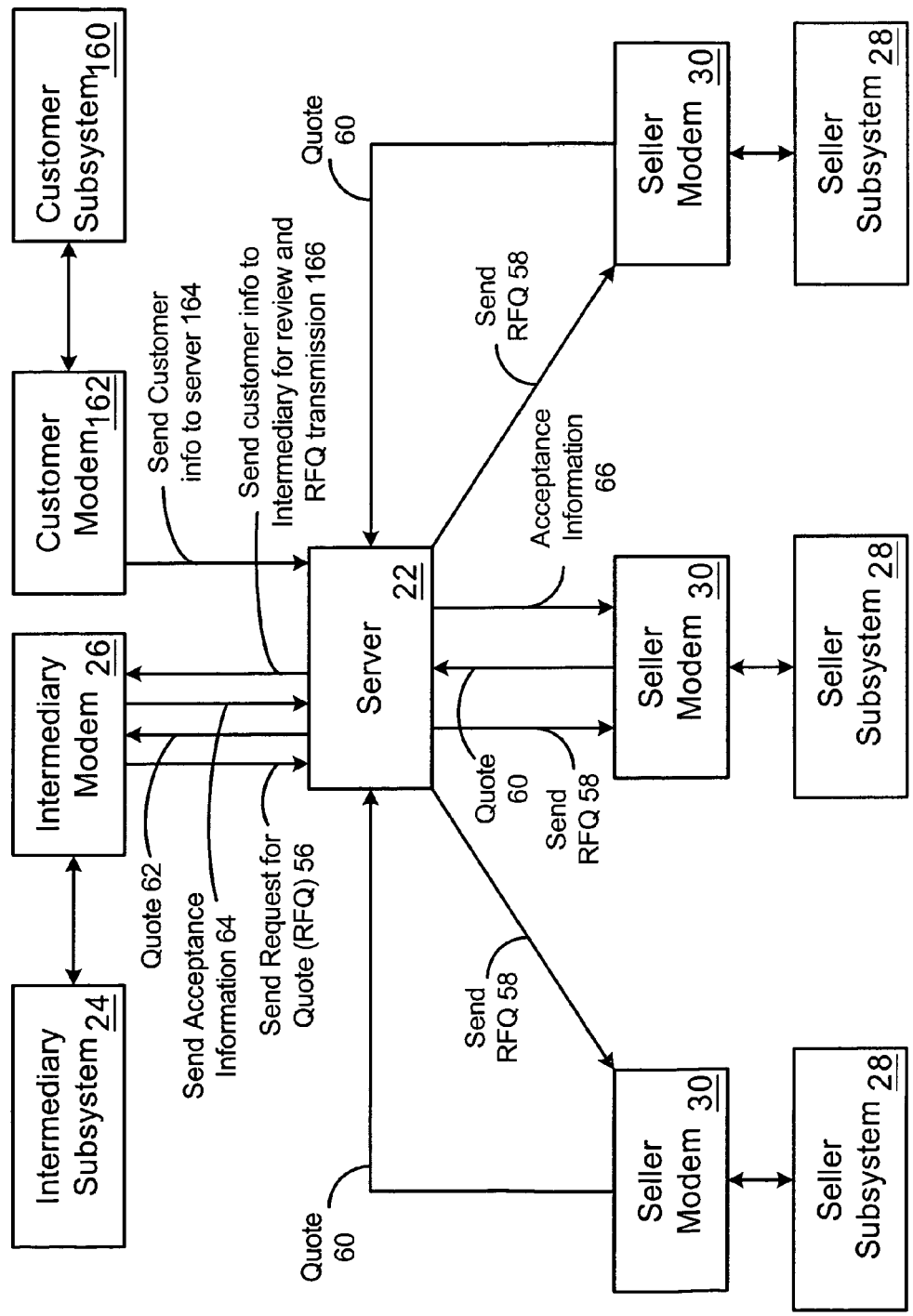
FIG. 7 illustrates the apparatus and process of a second embodiment of the invention.

FIG. 7 illustrates a second embodiment of the inventive apparatus. The apparatus of the second embodiment is similar to the apparatus of the first embodiment, except that the second embodiment includes a customer subsystem 160 connected to the server 22 via a customer modem 162. The customer subsystem is as shown in FIG. 3. The principal difference between the apparatus of the first and second embodiments is that, in the second embodiment, the customer uses the customer subsystem 160 and customer modem 162 to interact with the server 22. The customer uses the product database 34 to configure one's own vehicle, instead of simply providing the information to an intermediary and allowing the intermediary to configure a vehicle.

The additional process steps in the second embodiment are outlined in FIG. 7. At step 164, the customer has configured their vehicle using the product database 34 and transmits the final product and customer information to the server 22. The server transmits the customer's information to the intermediary at step 166, so that the intermediary can review the information, formulate an RFQ using the product and customer information, and transmit the RFQ to the appropriate target set of sellers. The advantage of retaining the intermediary in the process is that the intermediary has more expertise in using the apparatus and process and in dealing with sellers. The intermediary may thus be able to alert the customer to possibilities he hasn't considered. For example, if the customer configures a 1998 Ford Taurus and wants to pay less than $10,000, but the intermediary, by querying the product database 34 using the customer's product information, knows that there are many 1997 Ford Taurus cars available at deep discounts, the intermediary can notify the customer that a bargain may be possible.

Figure 8:
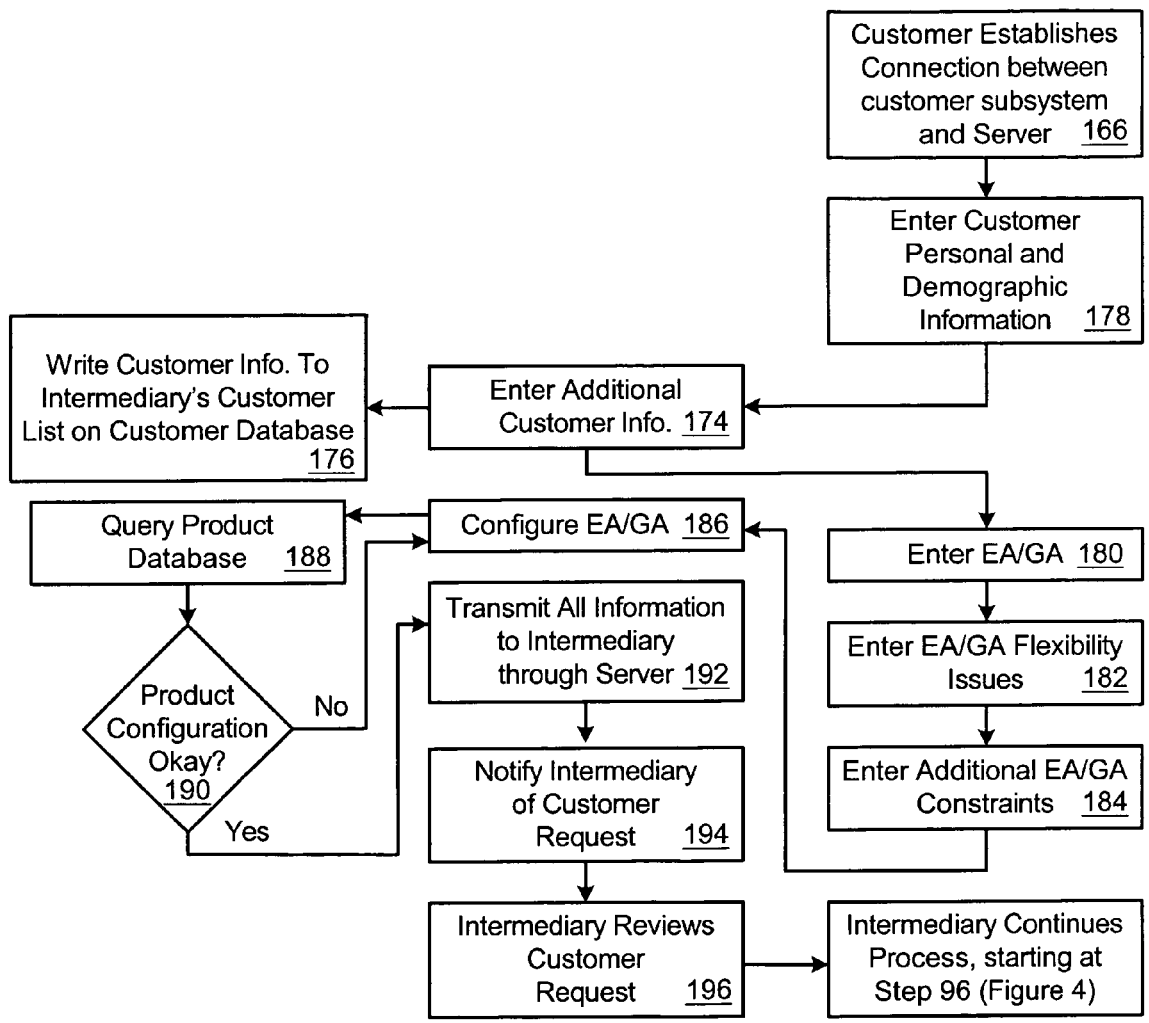
FIG. 8 is a flowchart illustrating the portion of the process of the second embodiment that is carried out by a customer.

The detailed process used in the second embodiment is similar to the process described FIGS. 4 through 6, except that steps 68 through 94 in FIG. 4 are replaced by the process shown in FIG. 8. The principal difference between the processes of the first and second embodiments relates to how the customer's information is entered into the apparatus and processed. In the first embodiment, the customer gives their demographic and product information to the intermediary, who then uses the intermediary subsystem 24, server 22 and its associated product database 34 to configure a feasible vehicle for the customer. In the second embodiment, the customer configures their own feasible vehicle first, and then sends that product information and their demographic information to the intermediary to finish the remainder of the process.

FIG. 8 illustrates the process of the second embodiment. The customer establishes a connection between the customer subsystem and the server at step 166. The customer usually accesses the server indirectly by, for example, clicking on a link to the server in an intermediary's web site. The customer inputs their personal and demographic information at step 178, their EA/GA information at steps 180 through 184. Any additional customer information is entered at step 174. The personal and demographic data and additional data are written in the intermediary's list of customer data in the customer database 34 at step 176. The customer then configures their product at step 186 and queries the database at step 188.

At step 190, the customer reviews the query results and assesses the feasibility of the configuration. If the configuration is not feasible, the customer returns to step 186 where the customer configures another product, again queries the product database 34 at step 188, and reviews the query results at step 190 to see if the configuration is feasible. Once a feasible configuration is found at step 190, the customer transmits the information to the server 22, which then transmits the information to the intermediary at step 192 and notifies the intermediary of the transmission at step 194. The intermediary reviews the customer's request at step 196 and continues with the remainder of the process shown in FIGS. 4 through 6, starting at step 96 in FIG. 4.

Third Embodiment

Figure 9:
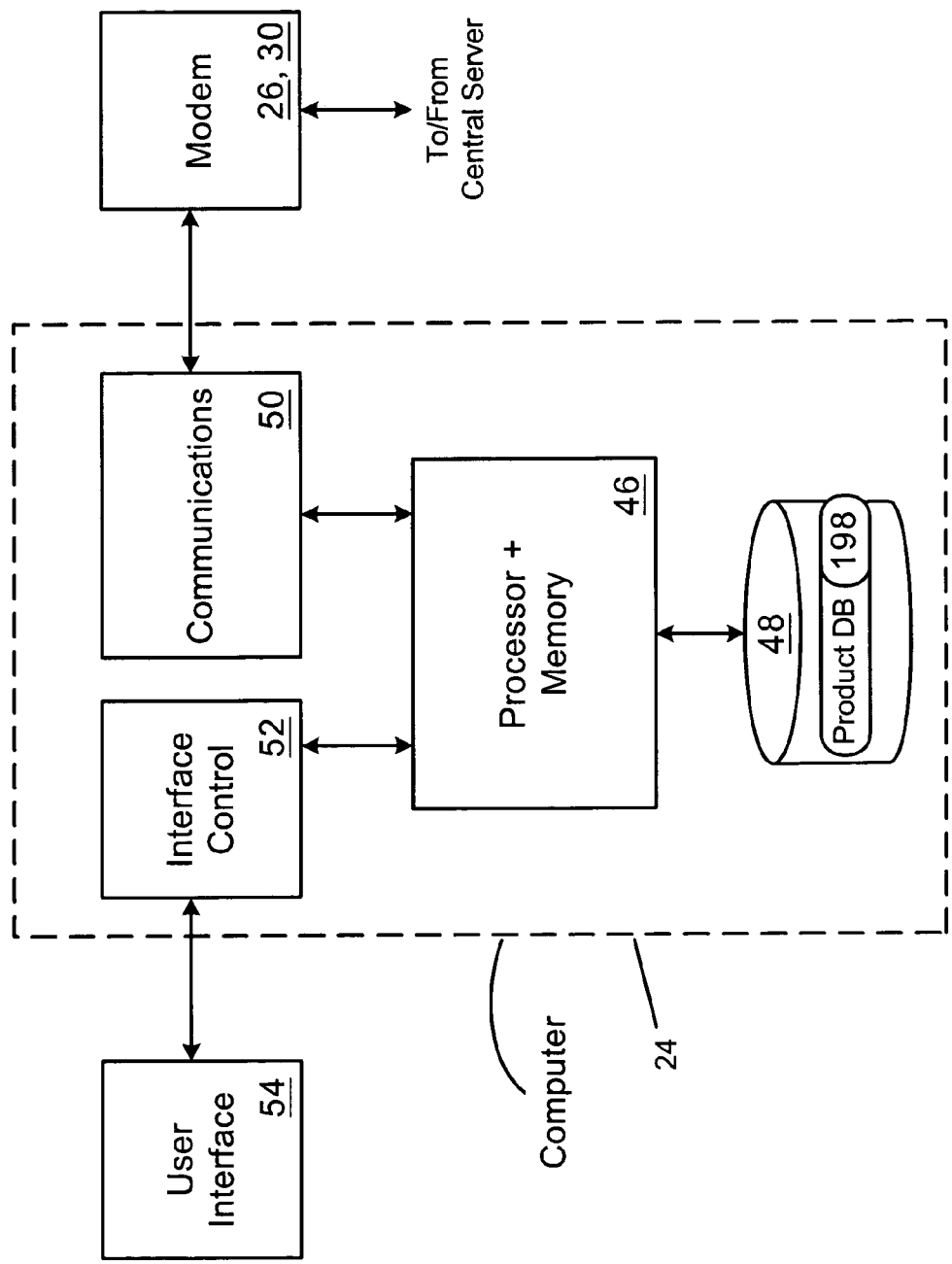
FIG. 9 illustrates the apparatus of an intermediary subsystem which, when combined with the apparatus and process shown in FIG. 1 or 7, forms a third embodiment apparatus and method.

A third embodiment of the apparatus uses the apparatus of FIG. 1, except that the intermediary subsystem 24 is as shown in FIG. 9. As shown in FIG. 9, the intermediary subsystem comprises a processor with memory 46, a communication controller 50, an interface controller 52, and a user interface 54, all three of which are connected to the processor. A storage device 48 is also connected to the processor, and the storage device 48 contains a second product database 198. The intermediary subsystem also includes software that allows the subsystem to communicate with the server. One example of suitable communication software is a web browser such as Microsoft Internet Explorer Version 4.0 with associated plug-ins. The plug-ins enable interaction with the second product database 198 from within the web browser.

The principal difference between the apparatus of the third and first embodiments is the location of the product database. In the first embodiment, the product database 34 resides on the server 22 only. In the third embodiment, a second product database 198 resides on the intermediary's subsystem. The second product database 198 is in addition to product database 34 located on the server 22. This apparatus configuration allows the intermediary to accomplish the configuration steps of the process without communicating with the server 22.

Figure 10:
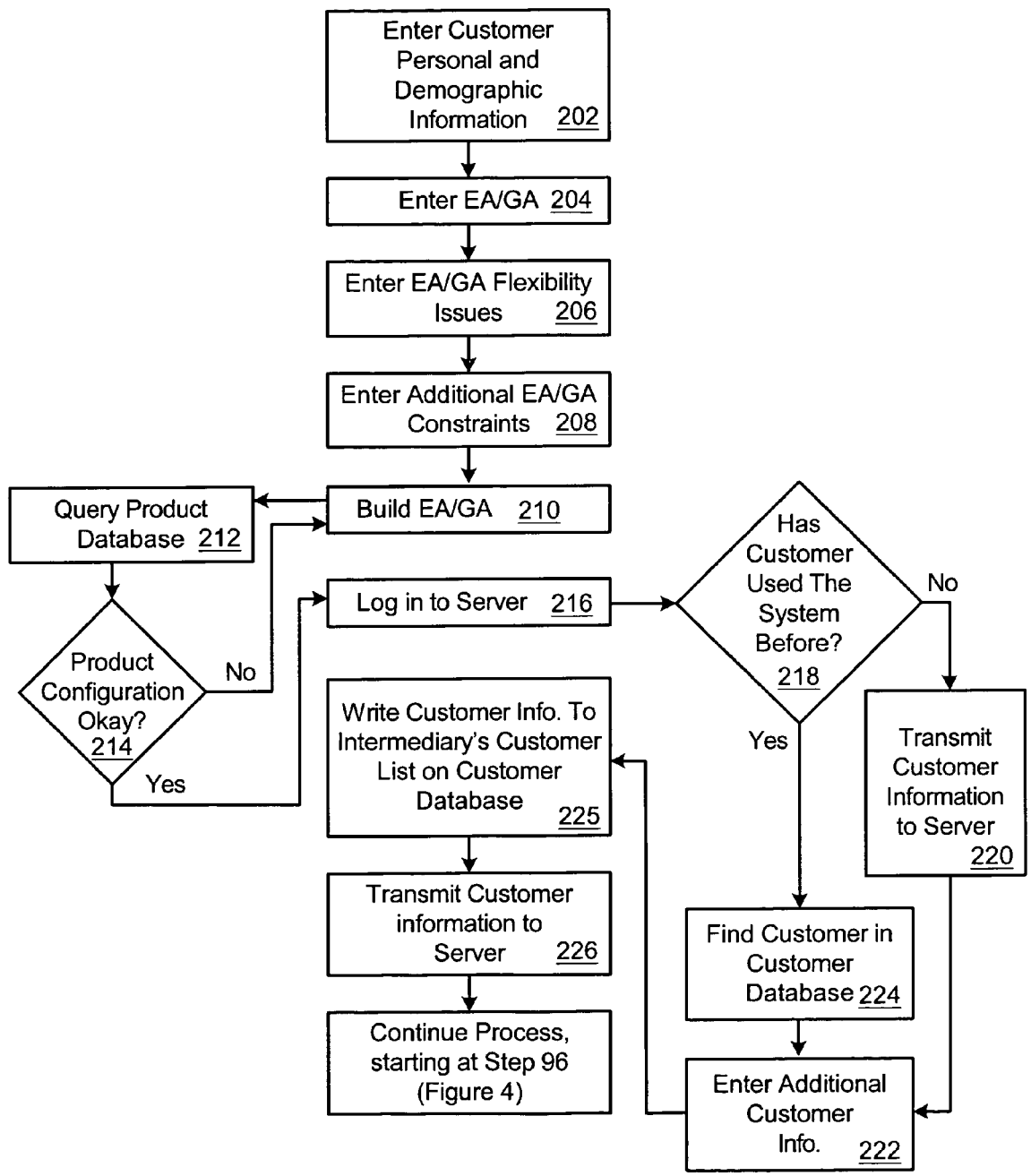
FIG. 10 is a flowchart illustrating the process used by an intermediary in a third embodiment of the invention.

The process for using the third embodiment is similar to that shown in FIGS. 4 through 6, except that steps 68 through 94 in FIG. 4 are replaced with the process shown in FIG. 10. Steps 202 to 214 in FIG. 10 are executed on the intermediary subsystem without communicating with the server. The intermediary inputs the customer's personal and demographic information at step 202, and the customer's EA/GA information, attribute flexibility information, and additional constraints at steps 204 through 208. The intermediary configures the customer's product configuration at step 210, queries the database at step 212, and reviews the query results at step 214 to assess whether the configuration is feasible. If the product configuration is not feasible, the intermediary returns to step 210 where the intermediary configures another configuration within the customer's attribute flexibility. The intermediary queries the database again at step 212, and reviews the query results at step 214 to see if the configuration is feasible.

Once the configuration is found to be feasible at step 214, the intermediary establishes a communications link with the server at step 216. At step 218, the intermediary determines whether the apparatus and process have previously been used on behalf of this particular customer. If the apparatus and process have not previously been used for this customer, the intermediary at step 220 transmits the customer's personal and demographic information from the intermediary subsystem to the customer database 38 on server 22. Any additional customer information is entered into the intermediary subsystem at step 222 and transmitted to the intermediary's customer list on the customer database at step 225. If the apparatus and process have previously been used on this customer's behalf, the intermediary queries the customer database at step 224 to obtain the customer's demographic information and enters any additional customer information at step 222. The customer information and additional information are written to the intermediary's list of customer information on the customer database at step 225. At step 226, the intermediary transmits the customer information to the server 22. The intermediary then continues with the remainder of the process shown in FIGS. 4 through 6, starting at step 96 in FIG. 4.

Fourth Embodiment

A fourth embodiment of the apparatus utilizes the apparatus of either the first, second or third embodiments. The primary difference between the process of fourth embodiment and the processes of the other embodiments is the process followed by the target sellers when they do not have the customer's EA in inventory.

Figure 11:
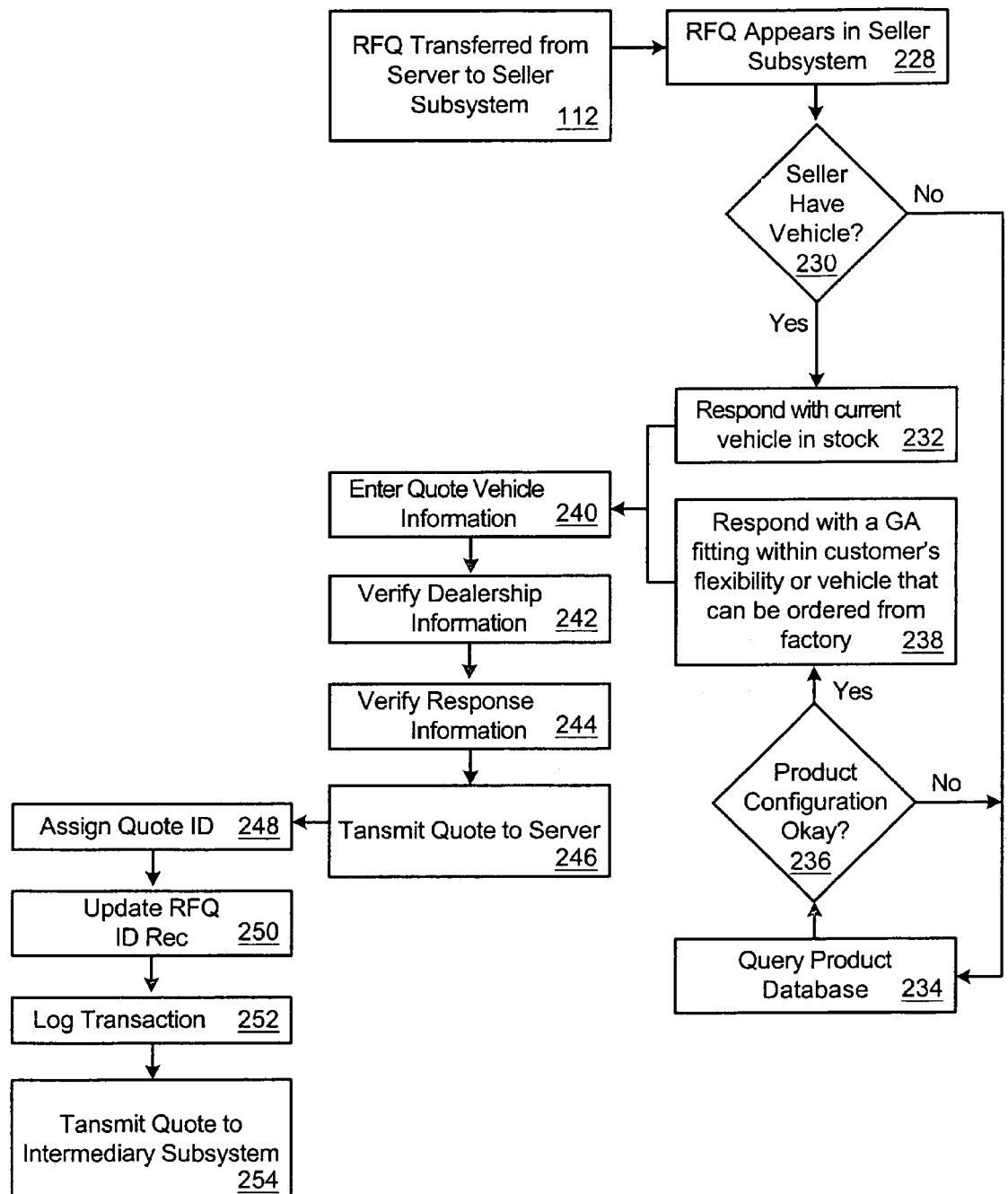
FIG. 11 is a flowchart illustrating the process used by a seller in a fourth embodiment of the invention.

The process used in the fourth embodiment is similar to that shown in FIGS. 4 through 6, except that the process shown in FIG. 11 replaces the seller's process shown in FIG. 5. In FIG. 11, a seller receives the RFQ at step 228, and at step 230 checks to see if a product having the EA attributes specified in the RFQ is in inventory. If the target seller has the EA in inventory, they respond to the RFQ with the EA at step 232. If they do not have the EA in inventory, the target seller, using the attribute flexibility information in the RFQ, proceeds to step 234. At step 34 the target seller queries the product database 34 to see if they can come up with a feasible configuration which they can submit in response to the RFQ. At step 236, the seller reviews the query results and assesses the feasibility of the configuration. If the configuration is feasible, the seller proceeds to step 238 and responds to the RFQ with this alternative GA configuration.

At steps 240 to 244, the target seller assembles the quote. At step 240, the target seller enters into the seller subsystem the information for the EA or GA, along with the asking price for the vehicle they are responding with and any additional constraints they wish to place on the transaction. Additional constraints include an expiration time for the quote, and optionally include delivery constraints, payment constraints, or any other contingencies. At step 242, the seller verifies the seller information accompanying the RFQ. The seller information is stored in the seller database and is transmitted with the RFQ. If any of the seller information is incorrect, the seller can correct it at this step and the seller database will be updated. At step 244, the seller verifies the quote information that is being submitted and proceeds to step 246, where the seller's quote is transmitted to the server. Once transmitted to the server, the quote is assigned a number for tracking purposes at step 248, and the RFQ database is updated to reflect that a quote responsive to the RFQ has been sent at step 250. The target seller's quote is transmitted then from the server to the intermediary subsystem at step 254.

Fifth Embodiment

In a fifth embodiment (not illustrated in the Figures) of the apparatus and process, the apparatus is the same as the apparatus of the first, second, third or fourth embodiments. The process of the fifth embodiment is identical to the process of the first, second, third or fourth embodiments. The difference between the process of the fifth embodiment and the process of other embodiments is that the customer now performs all the process steps previously performed by the intermediary. In other words, the customer uses the apparatus and method to submit RFQ's directly to the target set of sellers, and the target sellers use the apparatus and method to submit quotes in response to the RFQ directly to the customer.

Sixth Embodiment

Figure 12:
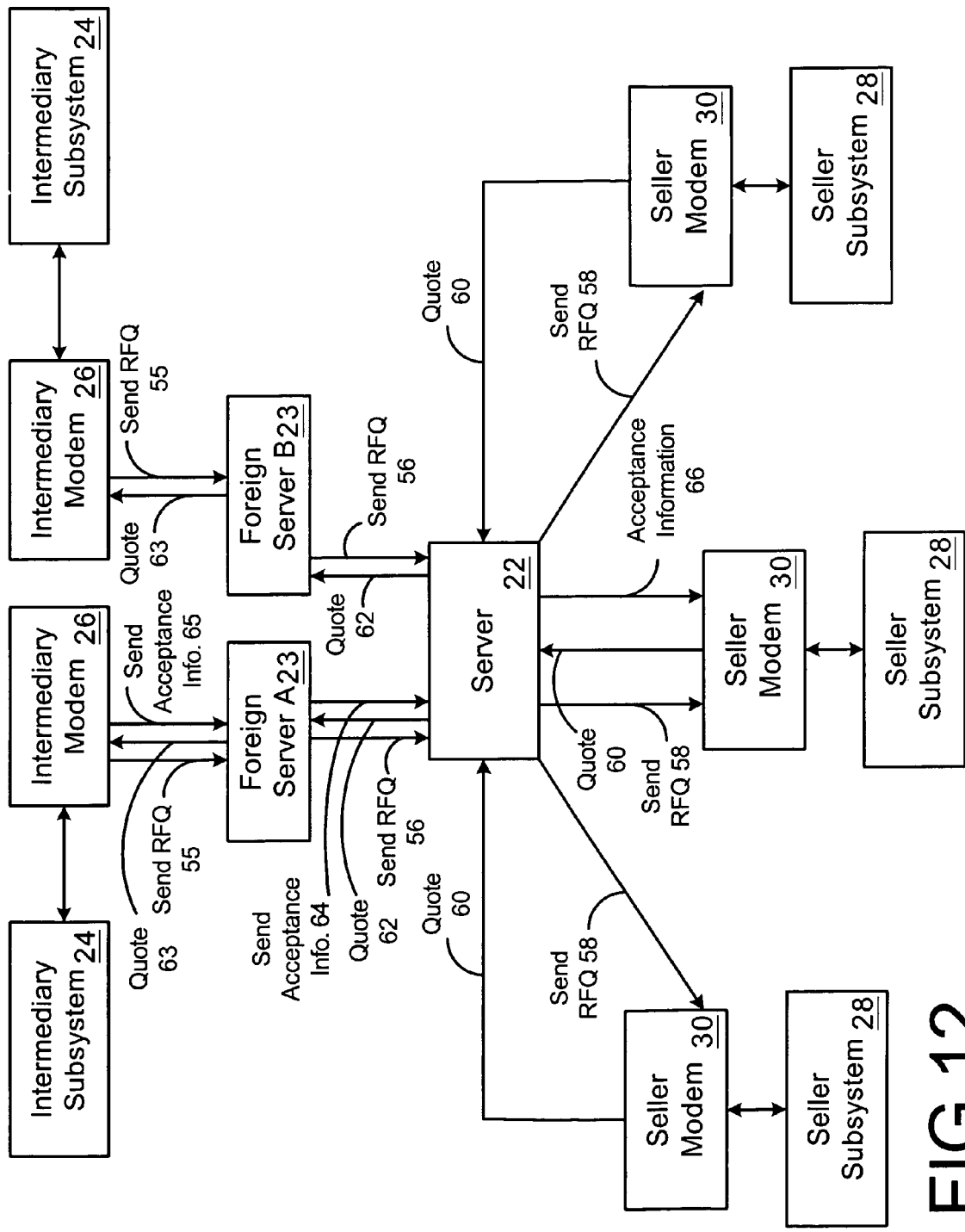
FIG. 12 illustrates the apparatus and process of a sixth embodiment of the invention.

A sixth embodiment of the inventive apparatus and process is illustrated in FIG. 12. The apparatus is similar to the apparatus of the first embodiment, except that the computer network includes one or more foreign servers 23 connected to the server 22, either directly or through intermediate servers (not shown). The foreign servers are "foreign" in the sense that they are hosted by a different entity than the entity hosting the server 22, and may or may not be configured the same as server 22 (shown in FIG. 2). One or more intermediary subsystems 24 are connected to each foreign server 23, and at least one seller subsystem 28 is also connected to the server 22 via seller modem 30. The intermediary and seller subsystems and modems are configured in the same way as the subsystems of the first embodiment (FIG. 3). One advantage of this network arrangement is that the intermediary may be connected to any server running some sort of vehicle configuration software, and need not maintain an account on, or know how to find and communicate with, the server 22. By collecting RFQ's from many foreign servers and distributing the RFQ's to target sets of sellers, a much larger pool of potential customers can access the set of sellers connected to the server 22.

In addition to illustrating the apparatus, FIG. 12 outlines the basic steps and information transfer of the process; the details of the process are further discussed below in connection with FIGS. 13, 14 and 15. Having put together a request for quote (RFQ) configuring the automobile the customer wants, at step 55 the intermediary transmits the RFQ from the intermediary subsystem 24 through the modem 26 to the foreign server 23. The foreign server 23 in turn transmits the RFQ to the server 22 at step 56. For each RFQ sent from the foreign server 23 to the server 22, the host of the foreign server uses a seller database residing on the server 22 to choose a target set of sellers, according to the criteria of geographic region and authorized dealers. At step 58, the RFQ is transmitted from the server 22 to a target set of seller modems 30 and corresponding seller subsystems 28.

If one or more sellers within the target set of sellers decide to submit a quote responsive to the RFQ, then at step 60 each seller transmits a "quote" from their seller subsystem 28 to the server 22. The quotes are transmitted from the server 22 to the foreign server 23 at step 62. At step 63, the quotes are transmitted from the foreign server 23 to the intermediary subsystem 24. The intermediary then communicates the quotes to the customer (this step not shown).

If the customer decides to accept one of the quotes, the customer notifies the intermediary and at step 65 the intermediary transmits an "acceptance response" to the foreign server 23, wherein the acceptance response contains information about the customer from the customer database and identifies a "selected seller." At step 64, the acceptance response is transmitted from the foreign server 23 to the server 22, and is then forwarded to the selected seller's subsystem at step 66.

For the apparatus and process to operate successfully as shown, the server and any foreign servers must use a common "language" for describing automobiles, i.e. the RFQ's, quotes and other data transmitted between servers must be put into a common data format or use a common data structure. By using a common data format, the product configuration process on a foreign server can interact with the product configuration process on the server, even if the configuration process differs between the two platforms. An example of such a "language" for describing automobiles is shown in Appendix A. The structure of the language is explained below.

Figure 13:
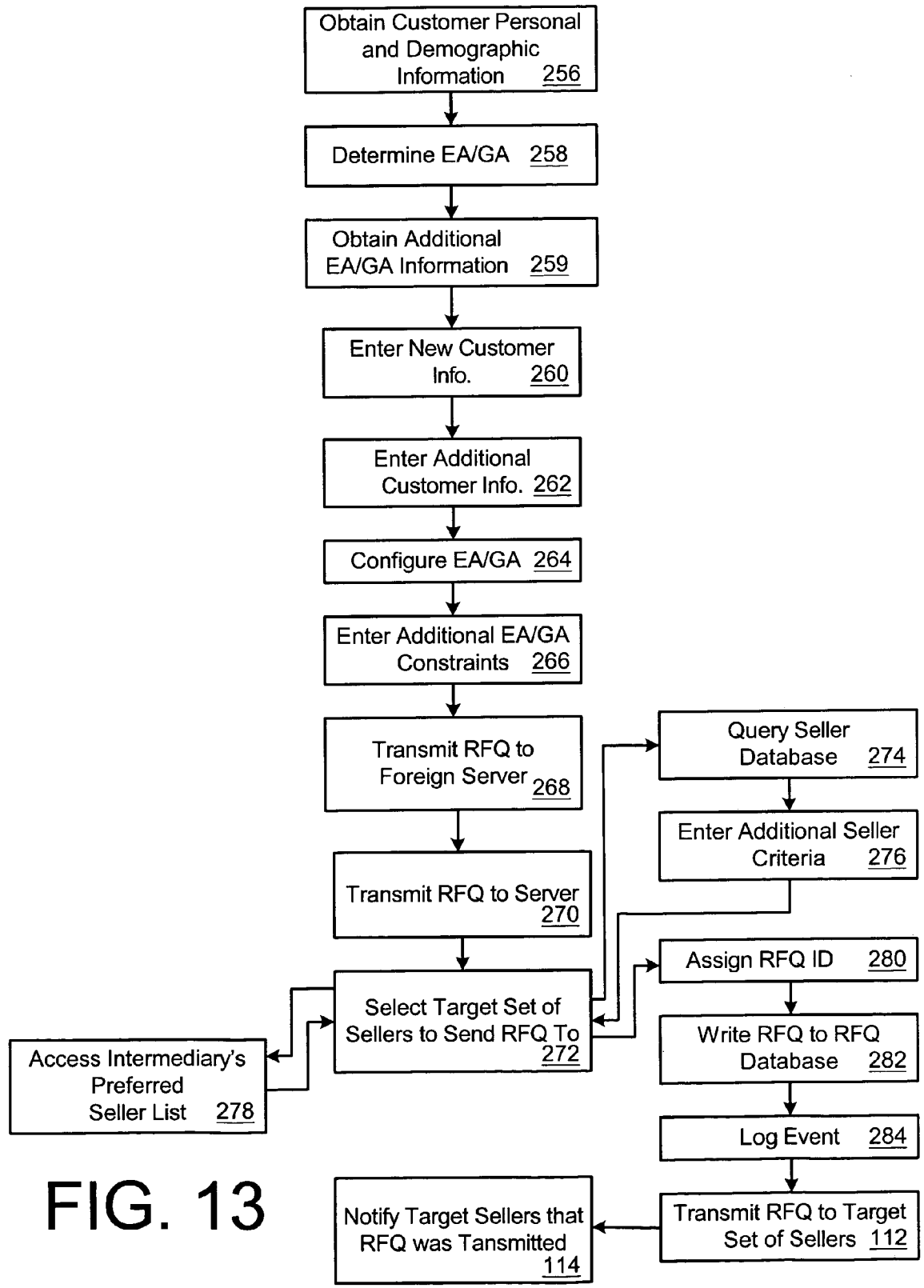
FIG. 13 is a flowchart illustrating an intermediary's portion of the process of the sixth embodiment.
Figure 14:
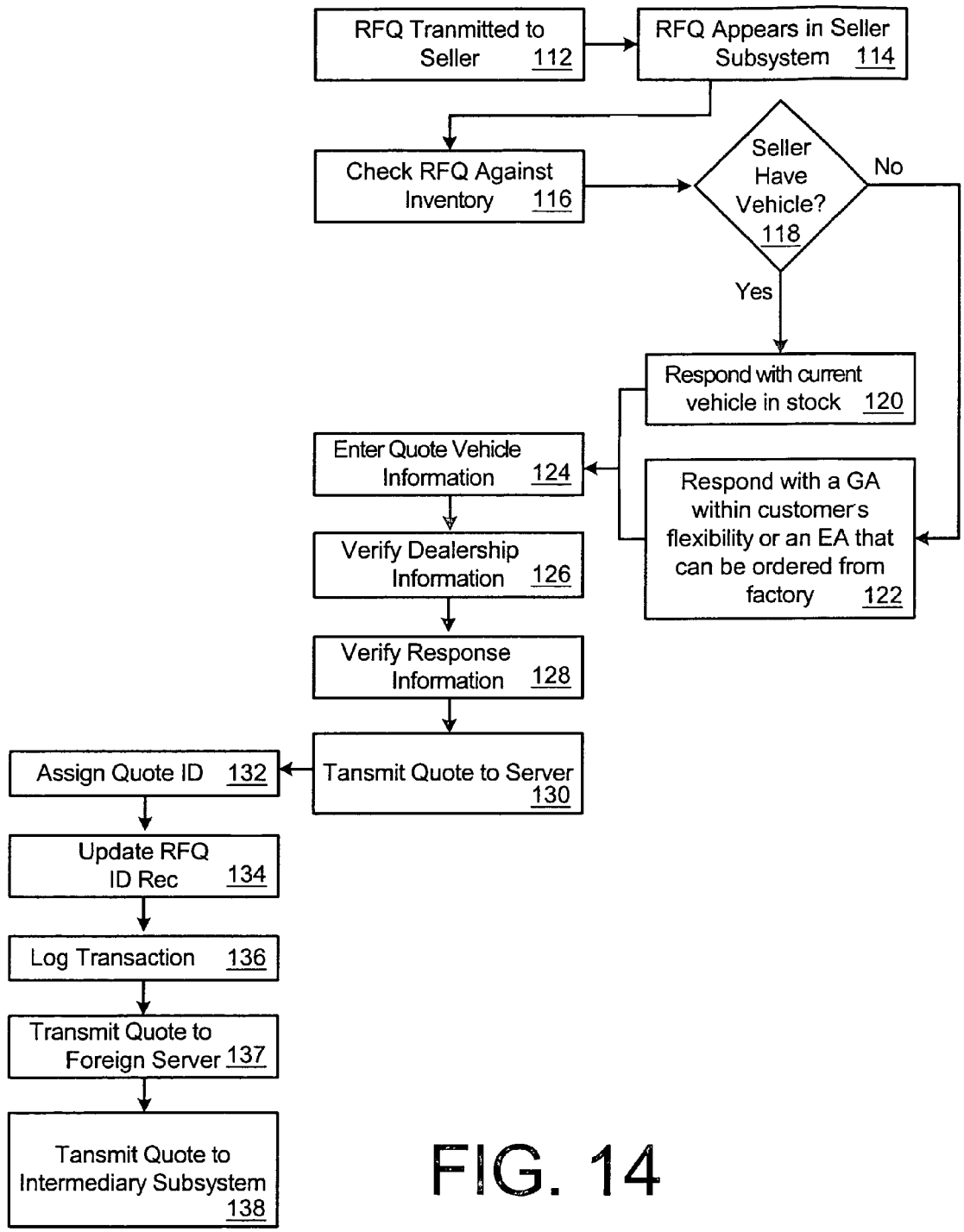
FIG. 14 is a flowchart illustrating the portion of the process of the sixth embodiment carried out by a target seller.
Figure 15:
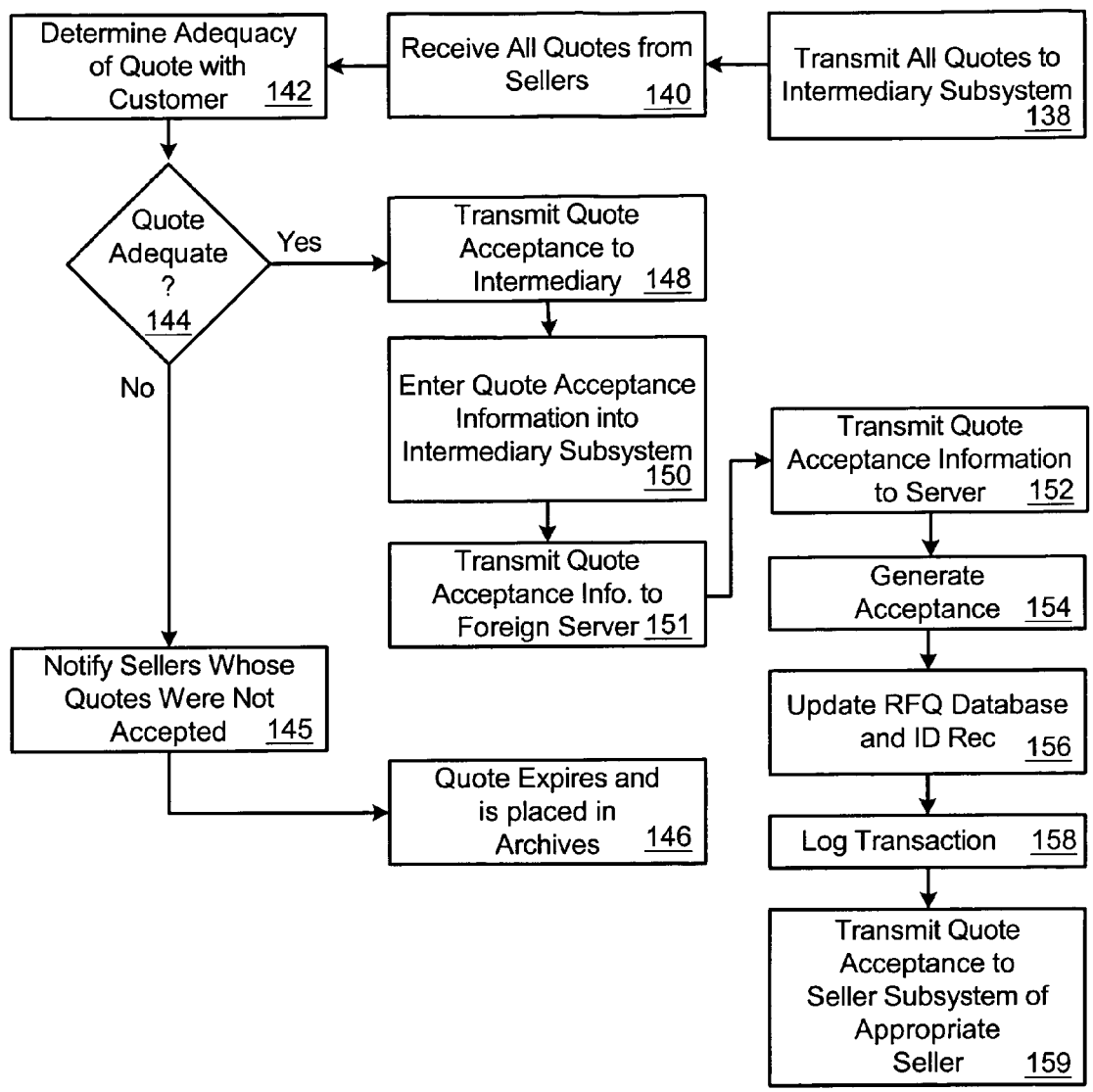
FIG. 15 is a flowchart illustrating the portion of the process used by the intermediary to reply to a quote received from a seller, the seller having responded using the process of FIG. 14.

FIGS. 13, 14 and 15 illustrate details of the process of the sixth embodiment. The process of the sixth embodiment is very similar to the process of the first embodiment; most of the differences between the first and sixth embodiments occur in the initial part of the process, shown in FIG. 13. The intermediary carries out the first part of the process. The process begins when a customer seeking to purchase appropriate goods (i.e., an automobile) contacts the intermediary. At step 256, the intermediary collects personal information from the customer such as their name, address, and financing information (i.e., ability to purchase up to a certain maximum price) and optionally collects demographic information concerning reasons for selecting a particular automobile and other information helpful for market research studies (e.g., age, household income, education, occupation, hobbies/interests, and the like).

Once the customer's personal and demographic information has been gathered, the intermediary gathers information regarding the customer's desired product attributes (i.e., the automobile configuration the customer wants). At step 258 the customer describes to the intermediary the general automobile (GA) they want, and optionally describes the exact automobile (EA) they want. At step 259 the intermediary gathers any additional constraints the customer may want to put on their GA or EA. Additional constraints may include items such as the customer's desired price range, or a date by which the customer must purchase the car. Having gathered necessary information from the customer, the intermediary establishes a connection between the intermediary subsystem 24 and the foreign server 23. The intermediary proceeds to steps 260 and 262, where the customer's personal and demographic information are entered into the intermediary subsystem 24.

The intermediary next configures the customer's EA and GA at step 264 using the customers GA/EA information and any additional information gathered. Step 264 is a generalization of steps 86 through 94 of the first embodiment (FIG. 4), because the configuration process on the foreign server 23 may be different than the process on server 22. Once the intermediary configures a vehicle, the next step is to put together an RFQ at step 266. As with the first embodiment, the RFQ consists primarily of the attribute set of the vehicle configured at step 264 plus any additional constraints. Additional customer constraints including an expiration date for the purchase and standard or custom terms of sale, are added to the RFQ at step 266. At step 268, the intermediary transmits the RFQ information to the foreign server 23, and at step 270 the RFQ is forwarded to the server 22.

When the RFQ has been transmitted to the server 22, the host of the foreign server must select a set of target sellers to which the RFQ will be sent. The foreign server host establishes a connection to the server 22 and, at step 272, selects a target set of sellers to which the RFQ will be sent. The foreign server host may use one of two methods to select the target set of sellers. In the first method, the foreign server host proceeds from step 272 and queries the seller database 36 (located on server 22) at step 274 based on selected criteria, for example geographic region and authorizations by manufacturers. The seller database 36 contains information about automobile sellers nationwide, including what product lines they carry and where they are located. The query result will usually be a list of sellers and brokers that are authorized by the relevant manufacturer (Ford in the example) to sell the specified product line, and that are located in the same geographical region as the customer. Sellers and brokers outside the customer's geographic region could also be found, and may be desirable if, for example, the sellers outside the region are sufficiently price competitive. At step 276, the foreign server host can filter the list of sellers based on further seller criteria to obtain a target set of sellers. If, for example, the foreign server host has had bad experiences with a particular seller or the particular seller has been unresponsive to previous RFQ's, that seller or broker can be removed from the potential target set of sellers.

The second method by which the foreign server host selects the target set of sellers is shown at step 278. At step 278 the foreign server host accesses their "preferred seller list" and selects the target set of sellers from this list. The foreign server host will have used steps 274 and 276 described above to compile their preferred seller list before even starting the process of FIG. 13, and will have saved the list of sellers resulting from steps 274 and 276 on the seller database for future use. The foreign server host can always update their preferred seller list.

Having assembled the RFQ and selected the target set of sellers, the foreign server host instructs the server 22 to transmit the RFQ to the target set of dealers. At step 280, the RFQ is assigned an identification number for tracking, and at steps 282 and 284 the RFQ is written to the RFQ database and the transaction is logged. The RFQ database resides on the server 22 and stores information for each RFQ processed by the apparatus, including the contents of the RFQ, the sellers to which it was sent, its expiration date (if any) and its status (i.e., expired, pending, responded to, etc.). At step 112, the RFQ is transmitted from the server 22 to the target set of sellers. At step 114, which is optional, the target set of sellers may be notified that an RFQ has been sent to them.

FIG. 14 shows a target sellers' side of the process once they receive an RFQ. The process followed by the target sellers in FIG. 14 is identical to the process of the first embodiment (shown in FIG. 5), except for the addition of step 137, where the target seller's quotes are transmitted from the server 22 to the foreign server 23.

FIG. 15 shows the intermediary's part of the process once the server 22 transmits the seller's quotes to the intermediary subsystem 24. This part of the process in the sixth embodiment is identical to the process followed by the intermediary in the first embodiment (shown in FIG. 6), except for the addition of step 151, where the quote acceptance information is transmitted from the foreign server 23 to the server 22.

Seventh Embodiment

Figure 16:
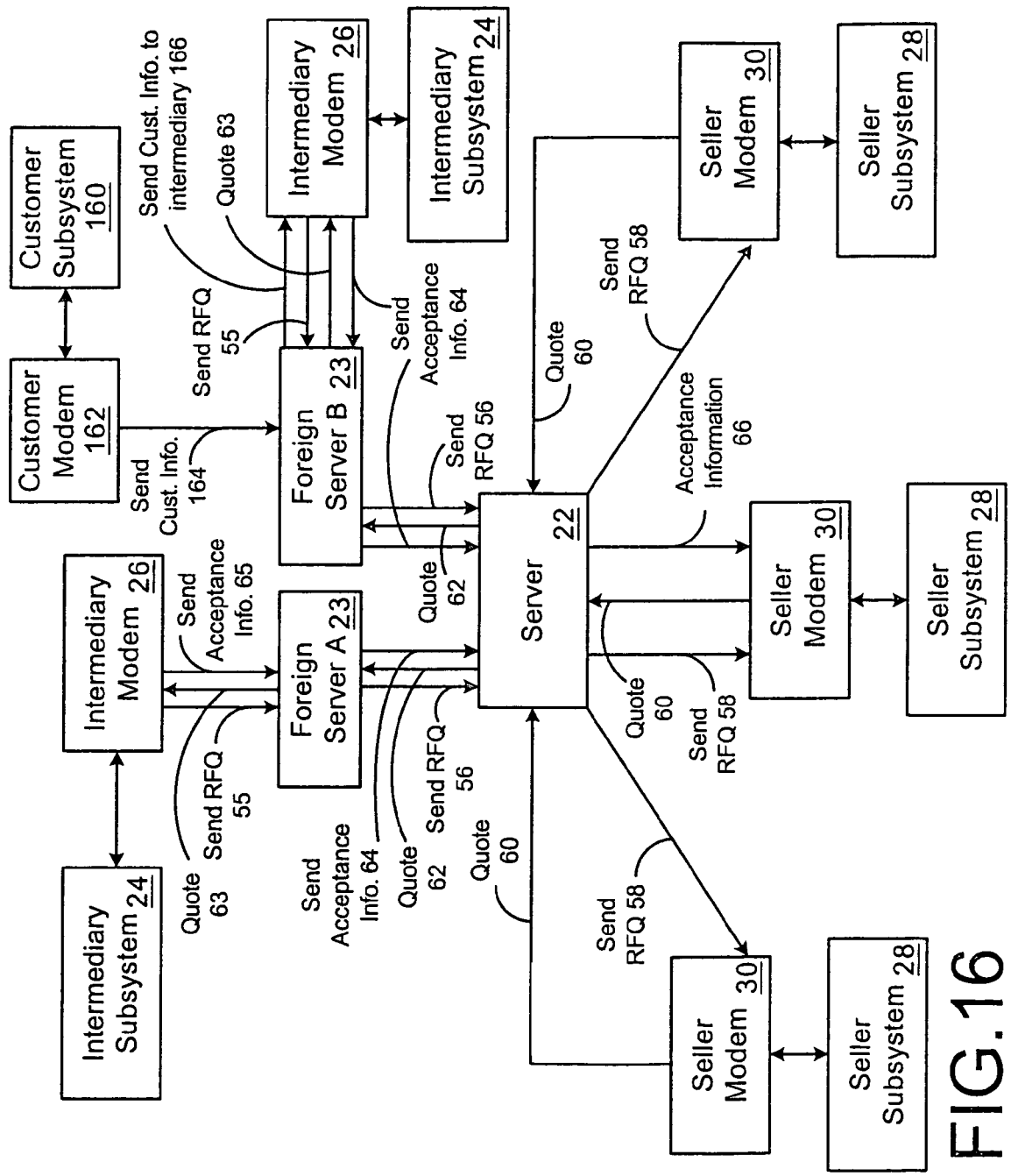
FIG. 16 illustrates the apparatus and process of a seventh embodiment of the invention.

FIG. 16 illustrates a seventh embodiment of the apparatus and process. The apparatus of the seventh embodiment is similar to the apparatus of the sixth embodiment, except the seventh embodiment includes a customer subsystem 160 connected to the foreign server 23 via a customer modem 162. The customer subsystem is as shown in FIG. 3. The principal difference between the apparatus of the sixth and seventh embodiments is that, in the seventh embodiment, the customer interacts directly with the foreign server 23. The customer uses the product configuration process on the foreign server 23 to configure their own vehicle, instead of simply providing the information to an intermediary and allowing the intermediary to configure a vehicle for them.

The process steps in the seventh embodiment are outlined in FIG. 16. As most of the process is identical to the process of the sixth embodiment (FIG. 12), only the additional steps of added for the seventh embodiment are discussed. At step 164, the customer has configured a vehicle and transmits the final configuration and customer information to the foreign server 23. The foreign server 23 transmits the customer's information to the intermediary at step 166, so that the intermediary can review the information, formulate an RFQ using the product configuration information, and transmit the RFQ from the subsystem 24 to the foreign server 23. Once the intermediary transmits the RFQ the foreign server 23, the process continues as in the sixth embodiment, with the foreign server 23 forwarding the RFQ to the server 22 and on to the selected target set of sellers. The advantage of retaining the intermediary in the process is that the intermediary usually has more expertise in using the apparatus and process and in dealing with sellers. Thus, the intermediary may be able to alert the customer to possibilities he or she had not considered.

Figure 17:
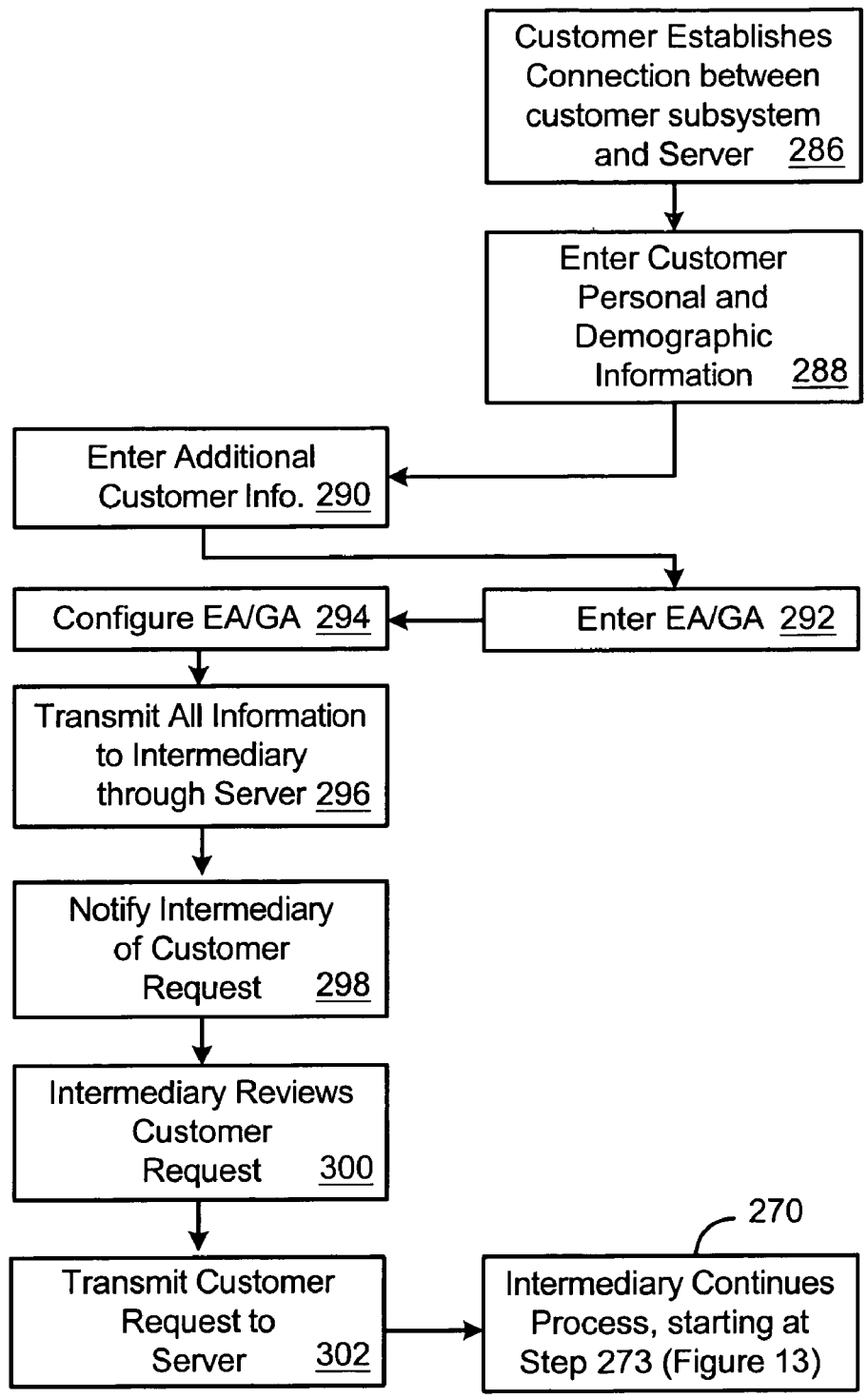
FIG. 17 is a flowchart illustrating the portion of the process of the seventh embodiment that is carried out by a customer.

The detailed process used in the seventh embodiment is similar to the process described for the sixth embodiment in FIGS. 13 through 15, except that steps 256 through 268 in FIG. 13 are replaced by the process shown in FIG. 17. The principal difference between the processes of the sixth and seventh embodiments relates to how the customer's information is entered into the apparatus and processed. In the sixth embodiment, the customer gives his or her demographic and product information to the intermediary, who then uses the intermediary subsystem 24 and foreign server 23 to configure a vehicle for the customer. In the seventh embodiment, the customer configures his or her own vehicle first, and then sends that product information along with the demographic information to the intermediary to finish the remainder of the process.

FIG. 17 illustrates the customer process of the seventh embodiment. The customer establishes a connection between the customer subsystem and the foreign server 23 at step 286. The customer usually accesses the foreign server 23 indirectly by, for example, clicking on a link to the foreign server in an intermediary's web site. The customer inputs their personal and demographic information at steps 288 and 290, and their EA/GA information at step 292. The customer then configures their product at step 294. As with the sixth embodiment, step 294 is a generalization of the configuration process of the first embodiment, since the configuration process on the foreign server 23 may be different than the configuration process on the server 22.

Once a configuration is found at step 294, the customer transmits the information to intermediary through the foreign server 23 at step 296. The foreign server 23 notifies the intermediary of the transmission at step 298. The intermediary reviews the customer's request and formulates an RFQ at step 300 and continues with the remainder of the process shown in FIGS. 13 through 15, starting at step 270 in FIG. 13.

Eighth Embodiment

An eighth embodiment (not shown) uses the apparatus of any one of the first through seventh embodiments, but varies the process slightly. The process of the eighth embodiment is one-way, as compared to all the previous embodiments, which operate in a two-way mode. In the eighth embodiment, the initial part of the process is the same: a customer or intermediary configures a car and transmits an RFQ to a target set of sellers, either directly through the server 22 or through a foreign server 23 connected to the server 22. In previous embodiments, the RFQ contained only public information related to the customer's desired car, such as the EA/GA information, flexibility information, and other constraints. The RFQ did not include the private customer information, such as name, address, phone, etc. In the eight embodiment, the RFQ contains the customer's information so that the target dealers can contact the customer directly by other means such as the telephone, rather than responding to the intermediary with a quote using the apparatus and process shown. Thus, using the first embodiment as an example, steps 68 through 114 are carried out as normal, but steps 116 through 159 are not carried out at all, or at least are not carried out using the apparatus and process disclosed herein.

An additional difference between the eighth and other embodiments is the method of selecting the target set of dealers to which the RFQ's will be sent. The target set of dealers may be selected manually by the intermediary or the foreign host operator as in previous embodiments, or may be automated. Automation is possible because the RFQ now contains the customer's private information. Thus, upon receipt of an RFQ, the server 22 can automatically use the customer's private information to query the seller database 36 to find a set of dealers near the customer. The query could, for example, use the customer's telephone area code and prefix, or could use the customer's zip code to automatically extract from the seller database 36 a target set of sellers in the customer's geographic area.

Ninth Embodiment

A ninth embodiment (not illustrated in the Figures) uses the apparatus of any one of the first through eighth embodiments and can use the process of any of the first through eighth embodiments. The major difference in the ninth embodiment is in who responds to the RFQ sent to the target set of sellers. If a particular seller cannot or does not want to send quotes in response to RFQ's, that seller can appoint an agent to reply to RFQ's. The agent uses the same response process as the sellers (shown, e.g., in FIGS. 5, 11 and 14). One difference in the process is that, whenever an RFQ is sent to a particular seller, that seller's appointed agent must be notified (by e-mail, phone, fax, or other means) that an RFQ has been sent to the seller.

Car Description Language

Appendix A illustrates an embodiment of a computer "language" for describing automobiles that can be used and understood by different computer platforms and vehicle configuration programs. The embodiment shown, which is the preferred embodiment of the language, uses Extensible Markup Language (XML). The vehicle description language comprises a hierarchical data structure containing nested blocks of data describing different aspects of the vehicle the customer wishes to purchase. Every block of data is either a top-level block or a sub-block. Sub-blocks may be nested within the top-level blocks or within other sub-blocks. Each block or sub-block may contain a number of data items, data items being the lowest level in the hierarchy and being the actual information describing the vehicle desired by the customer. Each top-level block includes starting and ending delimiters that mark the beginning and end of the block. Similarly, each sub-block includes starting and ending delimiters which mark the beginning and end of the sub-block and associate a sub-block with the block in which it is nested, i.e., the delimiters identify the top-level block or sub-block to which the particular sub-block belongs. The data items also have starting and ending delimiters that associate each data item with the block or sub-block within which it is nested. Top level blocks do not belong to any other blocks.

The two top-level blocks of data are the public block and the private block. The public block contains the information that anyone using the system can see; usually this is the information regarding the vehicle the customer wants to buy. The private block contains the customer information, including their contact information such as name, address and phone number.

Several sub-blocks of data are nested in the public block, each sub-block containing a different type of data. In the embodiment shown, there are three sub-blocks in the public block: a vehicle identification sub-block, a vehicle detail sub-block, and a color sub-block. The vehicle identification sub-block contains the basic information of the vehicle the customer wants to purchase (i.e., the customer's GA), such as manufacturer, make, model and model year. The vehicle detail sub-block contains all the detailed information regarding the particular vehicle configuration the customer wants (i.e. the customer's EA).

The vehicle detail sub-block itself has several sub-blocks of data nested therein. These sub-blocks include a standard sub-block containing information about the standard equipment found on the vehicle identified in the vehicle identification sub-block, and an option sub-block containing information about the optional equipment chosen for the car by the customer. Nested within the standard sub-block are sub-blocks blocks of data, known as categories. The categories a so labeled because data items describing the vehicle's standard information are grouped into categories relating to different parts of the car. Categories in the standard sub-block include the vehicle exterior, interior, etc.

The option sub-block is structures similarly to the standard sub-block, and also contains several categories containing data items relating to chosen options for the vehicle. Categories in the option sub-block include emissions, engine, transmission, preferred equipment groups, appearance packages, tires, seat type, seat trim, paint and additional options. The third sub-block in the vehicle detail sub-block is a color sub-block that contains categories relating to the coloration of each part of the vehicle.

Nine embodiments of the present invention have been described. A person skilled in the art, however, will recognize that many other embodiments are possible, including combinations of the embodiments presented. For this reason, the scope of the invention is not to be determined from the description of the embodiments, but must instead be determined solely from the claims that follow.

The invention claimed is:

1. A vehicle description language (VDL) hierarchical data structure that is stored in a memory system of one or more communicatively coupled computing systems interconnected through an intermediary subsystem and transmitted via communications medium between the communicatively coupled computing systems to communicate information associated with a vehicle in support of application(s) executing thereon, the data structure comprising:
- (a) a public block of data, having starting and ending delimiters that identify the beginning and end of the block of data, wherein the public block of data comprises:
  - (i) a vehicle identification sub-block hierarchically nested in the public block of data and comprising a plurality of data items wherein the data items are selected from the group consisting of manufacturer, model, model year and style of the vehicle,
  - (ii) a vehicle detail sub-block hierarchically nested in the public block of data, wherein the vehicle detail sub-block comprises:
    - (1) a standard feature sub-block hierarchically nested in the vehicle detail sub-block and comprising a plurality of standard feature categories, wherein each standard feature category is hierarchically nested in the standard feature sub-block and comprises a plurality of data items relating to standard equipment available on a vehicle, and
    - (2) an optional feature sub-block hierarchically nested in the vehicle detail sub-block and comprising a plurality of option categories, wherein each option category is hierarchically nested in the option sub-block and comprises a plurality of data items relating to a particular category of optional equipment desired on a particular vehicle; and
- (b) a private block of data comprising a plurality of data items relating to the customer who is ordering the vehicle including at least a ranking of product attributes;

wherein one of the computing systems receives the data structure and operates on at least the vehicle detail sub-block to select a subset of a target group of sellers by comparing at least features of the vehicle in a request for quote (RFQ) with products of at least one seller from the target group of sellers.

2. The vehicle description language of claim 1 wherein each sub-block contains a starting delimiter and an ending delimiter, wherein the starting delimiter identifies the block or sub-block within which the sub-block is nested.

3. The vehicle description language of claim 1 wherein each category consists essentially of a starting delimiter and an ending delimiter identifying the sub-block within which the category is nested.

4. The vehicle description language of claim 1 wherein each data item consists essentially of a starting delimiter and an ending delimiters identifying the block, sub-block or category within which the data item is nested.

5. The vehicle description language of claim 1 wherein the standard categories are selected from the group consisting of comprise exterior, interior, mechanical, safety, fuel mileage, rating, and combinations thereof.

6. The vehicle description language of claim 1 wherein the option categories are selected from the group consisting of emissions, engine, transmission, preferred equipment groups, appearance package, tires, seat type, seat trim, paint additional options, and combinations thereof.

7. The vehicle description language of claim 1 wherein the public block further comprises a color sub-block nested within the public block, wherein the color sub-block having nested therein categories comprises color selections and color combinations.

8. The vehicle description language of claim 1 wherein the data items in the private block comprise the customer's name, address and phone number.

9. The vehicle description language of claim 1 wherein the language is implemented with Extensible Markup Language (XML).

10. The vehicle description language of claim 1, wherein the vehicle description language is employed in communications between at least two communicatively coupled computing systems.

11. A storage medium comprising content which, when executed, causes a computing system to process a vehicle descriptor language (VDL) datagram including information to describe an automobile for transmission stored in a memory, the VDL datagram comprising:
- (a) a public block of data, having starting and ending delimiters that identify the beginning and end of the block of data, wherein the public block of data comprises:
  - (i) a vehicle identification sub-block hierarchically nested in the public block of data and comprising a plurality of data items wherein the data items are selected from the group consisting of manufacturer, mode, model year and style of the vehicle,
  - (ii) a vehicle detail sub-block hierarchically nested in the public block of data, wherein the vehicle detail sub-block comprises:
    - (1) a standard feature sub-block hierarchically nested in the vehicle detail sub-block and comprising a plurality of standard feature categories, wherein each standard feature category is hierarchically nested in the standard feature sub-block and comprises a plurality of data items relating to standard equipment available on a vehicle, and
    - (2) an optional feature sub-block hierarchically nested in the vehicle detail sub-block and comprising a plurality of option categories, wherein each option category is hierarchically nested in the option sub-block and comprises a plurality of data items relating to a particular category of optional equipment desired on a particular vehicle; and
- (b) a private block of data comprising a plurality of data items relating to the customer who is ordering the vehicle including at least a ranking of product attributes;

wherein computing system operates on at least the vehicle detail sub-block to select a subset of a target group of sellers by comparing at least features of the vehicle in a request for quote (RFQ) with products of at least one seller from the target group of sellers.

12. A storage medium according to claim 11, wherein the communicatively coupled memory is located within a remote computing appliance, coupled to the computing system through transmission means.

* * * * *